(12) United States Patent
Atohira

(10) Patent No.: US 10,434,650 B2
(45) Date of Patent: Oct. 8, 2019

(54) PROGRAMMING DEVICE WHICH GENERATES OPERATION PROGRAM AND METHOD FOR GENERATING PROGRAM

(71) Applicant: FANUC CORPORATION, Yamanashi (JP)

(72) Inventor: Hiroyuki Atohira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/026,618

(22) Filed: Jul. 3, 2018

(65) Prior Publication Data

US 2019/0015986 A1 Jan. 17, 2019

(30) Foreign Application Priority Data

Jul. 11, 2017 (JP) .................. 2017-135717

(51) Int. Cl.
*H04N 5/232* (2006.01)
*B25J 9/16* (2006.01)
*G06T 7/73* (2017.01)
*G06T 17/00* (2006.01)

(52) U.S. Cl.
CPC .......... *B25J 9/1671* (2013.01); *B25J 9/1697* (2013.01); *G06T 7/75* (2017.01); *H04N 5/23299* (2018.08); *G06T 17/00* (2013.01); *G06T 2207/30164* (2013.01); *G06T 2207/30244* (2013.01)

(58) Field of Classification Search
CPC ......... B25J 9/1671; B25J 9/1697; G06T 7/75; H04N 5/23299

USPC .......................................................... 348/95
See application file for complete search history.

(56) References Cited

U.S. PATENT DOCUMENTS

2017/0139407 A1* 5/2017 Sakaguchi ....... G05B 19/41885

FOREIGN PATENT DOCUMENTS

| JP | H10-128686 A | 5/1998 |
|---|---|---|
| JP | H10-264066 A | 10/1998 |
| JP | 2006-260271 A | 9/2006 |
| JP | 2007-90481 A | 4/2007 |
| JP | 2009-175954 A | 8/2009 |
| JP | 2014-240110 A | 12/2014 |
| JP | 2015-9324 A | 1/2015 |
| JP | 2015-136781 A | 7/2015 |
| WO | 2004/085120 A1 | 10/2004 |
| WO | 2017/033254 A1 | 3/2017 |

* cited by examiner

*Primary Examiner* — Nguyen T Truong
(74) *Attorney, Agent, or Firm* — Hauptman Ham, LLP

(57) ABSTRACT

A programming device capable of reducing the operator's work involved in generating an operation program for a robot. The programming device includes a model arrangement section which places a workpiece model, a robot model, and an imaging section model in a virtual space, a target-portion extracting section which extracts a target portion of the workpiece model in accordance with a certain extraction condition, a simulating section which moves the imaging section model or the workpiece model to an imaging position, and a program generating section which generates an operation program for causing the imaging section to capture the portion to be captured, based on positional data of the robot model when the robot model positions the imaging section model or the workpiece model at the imaging position.

11 Claims, 22 Drawing Sheets

US 10,434,650 B2

PROGRAMMING DEVICE WHICH GENERATES OPERATION PROGRAM AND METHOD FOR GENERATING PROGRAM

RELATED APPLICATIONS

The present application claims priority to Japanese Application Number 2017-135717, filed on Jul. 11, 2017, the disclosure of which is hereby incorporated by reference herein in its entirety.

BACKGROUND OF THE INVENTION

1. Field of the Invention

The invention relates to a programming device which generates an operation program and a method for generating a program.

2. Description of the Related Art

Techniques for automatically generating operation programs for robots are known (e.g., International Publication WO 2004-085120).

An operation program for causing a robot to move an imaging section or a workpiece and the imaging section to capture the workpiece may be generated. In this case, the operator's work involved in generating the operation program is preferably reduced.

SUMMARY OF INVENTION

In an aspect of the present disclosure, a programming device, which generates an operation program for moving an imaging section or a workpiece by a robot and imaging the workpiece by the imaging section, comprises a model arrangement section configured to arrange, in a virtual space, a workpiece model modeling the workpiece, a robot model modeling the robot, and an imaging section model modeling the imaging section; a target-portion extracting section configured to extract a target portion of the workpiece model, which corresponds to a portion of the workpiece to be imaged, in accordance with a predetermined extraction condition; a simulating section configured to move the imaging section model or the workpiece model by the robot model to an imaging position where the imaging section model is to image the target portion extracted by the target-portion extracting section; and a program generating section configured to generate an operation program for causing the imaging section to image the portion of the workpiece to be imaged, based on positional data of the robot model when the robot model positions the imaging section model or the workpiece model at the imaging position.

In another aspect of the present disclosure, a method of generating an operation program for moving an imaging section or a workpiece by a robot and imaging the workpiece by the imaging section, comprises arranging, in a virtual space, a workpiece model modeling the workpiece, a robot model modeling the robot, and an imaging section model modeling the imaging section; extracting a target portion of the workpiece model, which corresponds to a portion of the workpiece to be imaged, in accordance with a predetermined extraction condition; moving the imaging section model or the workpiece model by the robot model to an imaging position where the imaging section model is to image the extracted target portion; and generating an operation program for causing the imaging section to image the portion of the workpiece to be imaged, based on positional data of the robot model when the robot model positions the imaging section model or the workpiece model at the imaging position.

According to the present disclosure, since an operation program for a series of operations of a robot system can be taught independently of the operator's experience, the time taken to start up the system can be considerably reduced.

DETAILED DESCRIPTION

Figure 1:
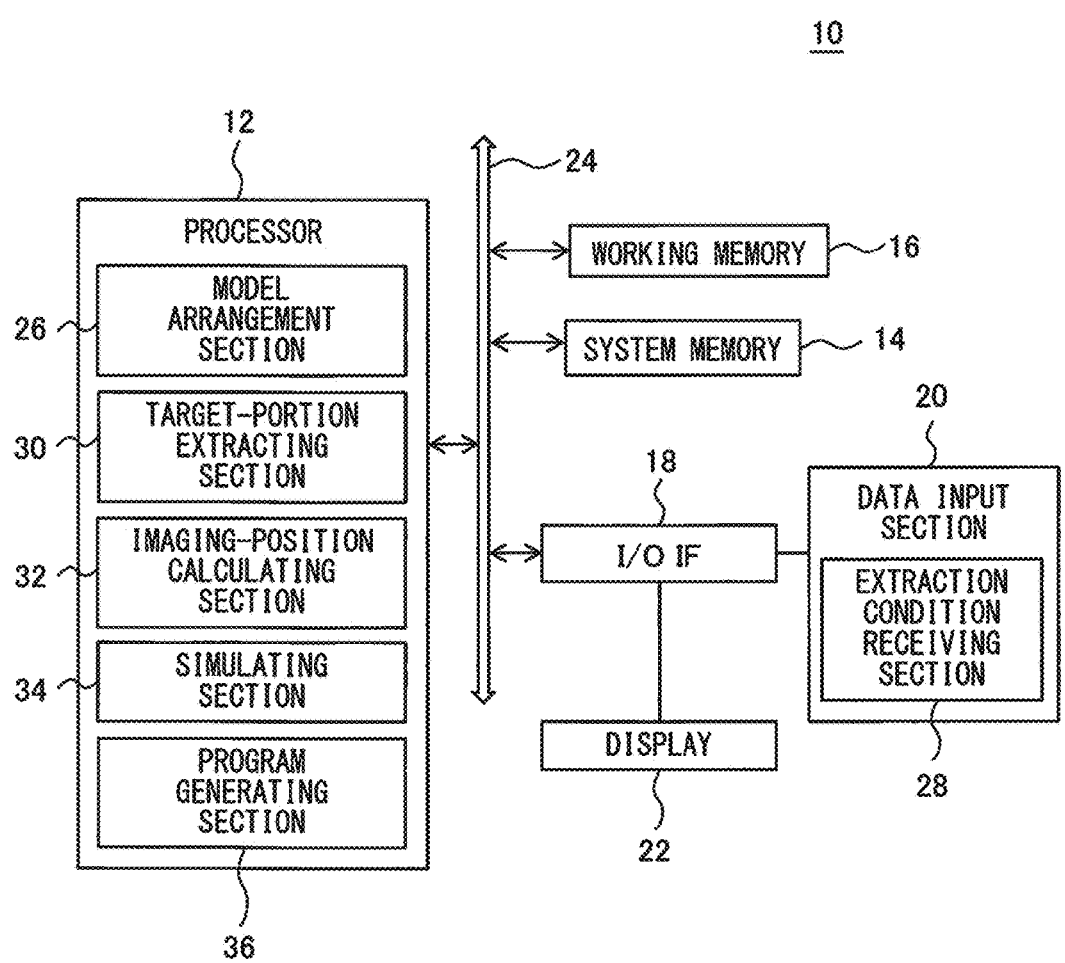
FIG. 1 is a block diagram illustrating a programming device according to one embodiment.

Embodiments of the present disclosure will be described in detail below with reference to the drawings. In various embodiments to be described below, similar elements are assigned the same reference numerals, and repetitive descriptions thereof will be omitted. Further, in the following description, the x-axis positive direction of a robot coordinate system $C_R$ is referred to as the rightward direction, the y-axis positive direction of the robot coordinate system $C_R$ is referred to as the rearward direction, and the z-axis positive direction of the robot coordinate system $C_R$ is referred to as the upward direction, for the sake of convenience.

A programming device 10 according to an embodiment will be described with reference to FIG. 1. The programming device 10 includes a processor 12, a system memory 14, a working memory 16, an input/output interface (I/O interface) 18, a data input section 20, and a display 22.

The processor 12, is communicably connected to the system memory 14, the working memory 16, and the I/O interface 18 via a bus 24, and executes various processes described later while communicating with these elements.

The system memory 14 is comprised of an electrically erasable programmable nonvolatile memory, such as an EEPROM®. The system memory 14 records constants, variables, set values, computer programs, etc., which are necessary to execute various processes described later, so as not to be lost when the programming device 10 is shut down.

The working memory 16 temporarily stores data necessary for the processor 12 to execute various processes. Further, the constants, variables, set values, computer programs, etc., recorded in the system memory 14 are appropriately loaded on the working memory 16, wherein the processor 12 uses the data loaded on the working memory 16 in order to execute various processes.

The I/O interface 18 is communicably connected to the data input section 20, and receives data from the data input section 20 in accordance with a command from the processor 12. The I/O interface 18 is also communicably connected to the display 22, and transmits image data to the display 22 in accordance with a command from the processor 12.

The I/O interface 18 is comprised of e.g. an Ethernet port or a USB port, and may communicate with the data input section 20 and the display 22 by wire. Alternatively, the I/O interface 18 may wirelessly communicate with the display 22 and the data input section 20 via a wireless LAN such as Wi-Fi.

The data input section 20 is comprised of e.g. a keyboard, a touch panel, or a mouse, and the operator can input data by operating the data input section 20. The data input section 20 transmits the input data to the processor 12 via the I/O interface 18.

The display 22 is comprised of e.g. a CRT, a Liquid Crystal Display (LCD), or an organic EL display. The display 22 receives image data transmitted from the I/O interface 18, and displays it as an image viewable for an operator.

The programming device 10 generates an operation program for moving an imaging section 104 and a workpiece 150 relative to each other by a robot 102 and imaging the workpiece 150 by the imaging section 104.

An example of a robot system 100 in a real space will be described below with reference to FIG. 2. The robot system 100 includes a robot 102 and an imaging section 104. The robot 102 is a vertical articulated robot, and includes a robot base 106, a rotary body 108, a robot arm 110, and a wrist 112. The robot base 106 is fixed on a floor of a work cell in the real space.

The rotary body 108 is mounted to the robot base 106 so as to be rotatable about the vertical axis. The robot arm 110 includes an upper arm 116 rotatably connected to the rotary body 108, and a lower arm 118 rotatably connected to a distal end of the upper arm 116. The wrist 112 is connected to a distal end of the lower arm 118, and rotatably supports the imaging section 104.

A robot coordinate system $C_R$ is set for the robot 102. The robot 102 moves each movable component (i.e., the rotary body 108, the upper arm 116, the lower arm 118, and the wrist 112) thereof with reference to the robot coordinate system $C_R$. For example, the z-axis of the robot coordinate system $C_R$ is arranged parallel to the vertical direction in the real space, and the rotary body 108 is rotated about the z-axis of the robot coordinate system $C_R$.

A tool coordinate system $C_T$ is set for an end effector (in this embodiment, the imaging section 104) of the robot 102. The tool coordinate system $C_T$ defines the position and orientation of the imaging section 104 in the robot coordinate system $C_R$.

The robot 102 moves the rotary body 108, the robot arm 110, and the wrist 112 in the robot coordinate system $C_R$ so as to match the position and orientation of the imaging section 104 with those defined by the tool coordinate system $C_T$.

The imaging section 104 is connected to a distal end of the wrist 112. The imaging section 104 is comprised of e.g. a vision sensor, and includes an image sensor, such as a CCD or a CMOS, and an optical system, such as a focus lens. The imaging section 104 images an object such as a workpiece 150 to acquire an image thereof.

A sensor coordinate system $C_S$ is set for the imaging section 104. For example, the z-axis direction of the sensor coordinate system $C_S$ is set to coincide with the visual line direction of the imaging section 104. The visual line of the imaging section 104 coincides with the optical axis of light incident on the optical system of the imaging section 104.

In this embodiment, the positional relationship between the tool coordinate system $C_T$ and the sensor coordinate system $C_S$ is predetermined and known in advance. More specifically, the x-y planes of the tool coordinate system $C_T$ and the sensor coordinate system $C_S$ are parallel to each other.

The robot system 100 respectively images portions of the workpiece 150 by the imaging section 104. In the example illustrated in FIG. 2, the workpiece 150 includes a main body 152 and parts 154, 156, 158, 160, 162, 164, and 166 projecting from the main body 152.

More specifically, the main body 152 has an upper face 168, and a rear face 170 and a right face 172 which are perpendicular to the upper face 168 and extend downwards from the upper face 168. The parts 154, 156, and 158 project upward from the upper face 168. The parts 160 and 162 project rearward from the rear face 170. The parts 164 and 166 project rightward from the right face 172.

Below, a case will described in which the operator sets only the parts 154, 156, 158, and 160 of the parts 154, 156, 158, 160, 162, 164, and 166 as portions to be imaged by the imaging section 104.

The robot 102 images the parts 154, 156, 158, and 160 by the imaging section 104 in a predetermined order. As an example, the robot 102 moves the imaging section 104 so as to position the imaging section 104 at a first imaging position with respect to the workpiece 150.

When the imaging section 104 is arranged at the first imaging position with respect to the workpiece 150, the part 154 is within the field of view of the imaging section 104 such that the imaging section 104 can image the part 154. Then, the imaging section 104 images the part 154.

Then, the robot 102 moves the imaging section 104 so as to position the imaging section 104 at a second imaging position with respect to the workpiece 150. When the imaging section 104 is arranged at the second imaging position with respect to the workpiece 150, the part 156 is within the field of view of the imaging section 104 such that the imaging section 104 can image the part 156. Then, the imaging section 104 images the part 156.

Then, the robot 102 moves the imaging section 104 so as to position the imaging section 104 at a third imaging position with respect to the workpiece 150. When the imaging section 104 is arranged at the third imaging position with respect to the workpiece 150, the part 158 is within the field of view of the imaging section 104 such that the imaging section 104 can image the part 158. Them, the imaging section 104 images the part 158.

Then, the robot 102 moves the imaging section 104 so as to position the imaging section 104 at a fourth imaging position with respect to the workpiece 150. When the imaging section 104 is arranged at the fourth imaging position with respect the workpiece 150, the part 160 is within the field of view of the imaging section 104 such that the imaging section 104 can image the part 160. Then, the imaging section 104 images the part 160.

In this way, the robot system 100 carries out a series of operations, i.e., sequentially moving the imaging section 104 by the robot 102, and sequentially imaging the parts 154, 156, 158, and 160 as the portions to be imaged, by the imaging section 104.

Figure 3:
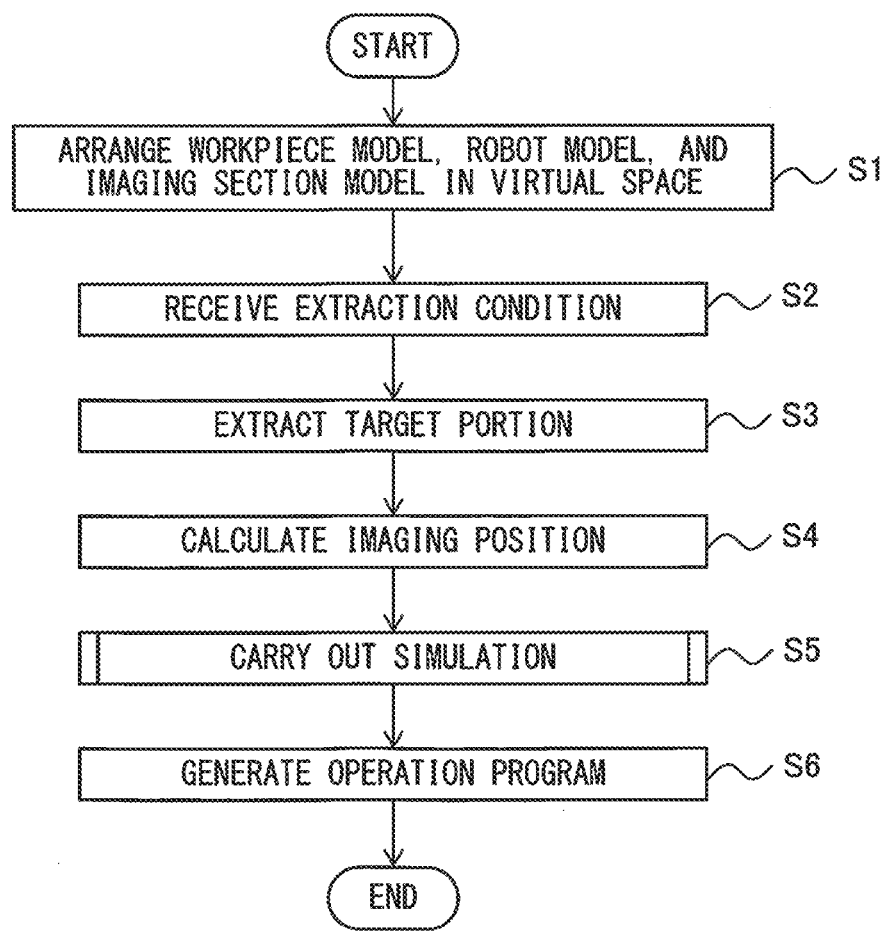
FIG. 3 is a flowchart illustrating one exemplary operation sequence of the programming device illustrated in FIG. 1.

The programming device 10 according to this embodiment generates an operation program for such a series of operations of the robot system 100. An exemplary function of the programming device 10 will be described below with reference to FIG. 3. The flow illustrated in FIG. 3 is started when the programming device 10 is activated.

Figure 4:
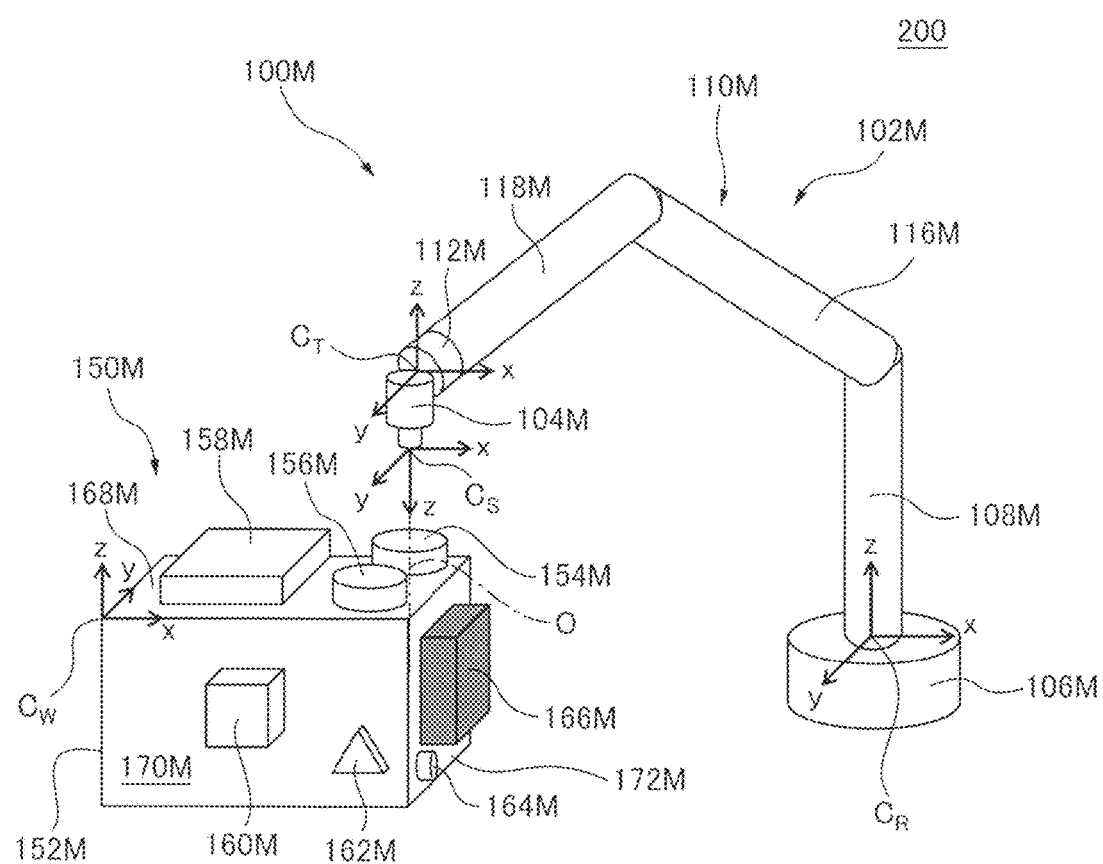
FIG. 4 illustrates one exemplary virtual space generated in step S1 of FIG. 3.

In step S1, the processor 12 arranges a workpiece model 150M, a robot model 102M, and an imaging section model 104M in a virtual space 200. FIG. 4 illustrates an example of the virtual space 200 in this case.

Note that, in this specification, if a component in the real space is referred to as "XX," a model of this component in the virtual space 200 will be referred to as "XX model." For example, a model of "robot base" in the real space is referred to as "robot base model." In this embodiment, all "XX models" are three dimensional.

The processor 12 arranges the robot model 102M in the virtual space 200 in accordance with the input operation by the operator. The robot model 102M is three-dimensional Computer Graphics (CG) which models the robot 102 illustrated in FIG. 2, and includes a robot base model 106M, a rotary body model 108M, a robot arm model 110M, and a wrist model 112M.

As an example, the system memory 14 pre-stores different types of robot models, including the robot model 102M. The processor 12 generates image data showing the different types of robot models stored in the system memory 14 in the form of a list, and displays it on the display 22. The operator operates the data input section 20 so as to select a desired robot model from the list displayed on the display 22.

If the operator selects the robot model 102M illustrated in FIG. 4, the data input section 20 transmits the data input by the operator to the processor 12 via the I/O interface 18.

The processor 12 reads out the robot. model 102M from the different types of robot models stored in the system memory 14 in accordance with the received input data, and arranges it in the virtual space 200. Then, the processor 12 sets a robot coordinate system $C_R$ and a tool coordinate system $C_T$ for the robot model 102M, at positions similar to those in FIG. 2.

Similarly, the processor 12 arranges the imaging section model 104M in the virtual space 200 in accordance with the input operation by the operator. The imaging section model 104M is three-dimensional CG which models the imaging section 104 illustrated in FIG. 2.

As an example, the system memory 14 pre-stores different types of imaging section models, including the imaging section model 104M. The processor 12 generates image data showing the different types of imaging section models stored in the system memory 14 in the form of a list, and displays it on the display 22. The operator operates the data input section 20 so as to select a desired imaging section model from the list displayed on the display 22.

If the operator selects the imaging section model 104M illustrated in FIG. 4, the processor 12 reads out the imaging section model 104M from the different types of imaging section models stored in the system memory 14, in accordance with the input data received from the data input section 20 via the I/O interface 18, and arranges it in the virtual space 200.

At this time, the processor 12 arranges the imaging section model 104M at the distal end of the wrist model 112M so as to correspond to the mount position of the real imaging section 104. Then, the processor 12 sets a sensor coordinate system $C_S$ for the imaging section model 104M at a position similar to that in FIG. 2.

Similarly, the processor 12 arranges the workpiece model 150M in the virtual space 200 in accordance with the input operation by the operator. As an example, the system memory 14 pre-stores different types of workpiece models, including the workpiece model 150M.

The processor 12 generates image data showing the different types of workpiece models stored in the system memory 14 in the form of a list, and displays it on the display 22. The operator operates the data input section 20 so as to select a desired workpiece model from the list displayed on the display 22.

When the operator selects the workpiece model 150M illustrated in FIG. 4, the processor 12 reads out the workpiece model 150M from the different types of workpiece models stored in the system memory 14, in accordance with the input data received from the data input section 20 via the I/O interface 18, and arranges it in the virtual space 200.

Figure 2:
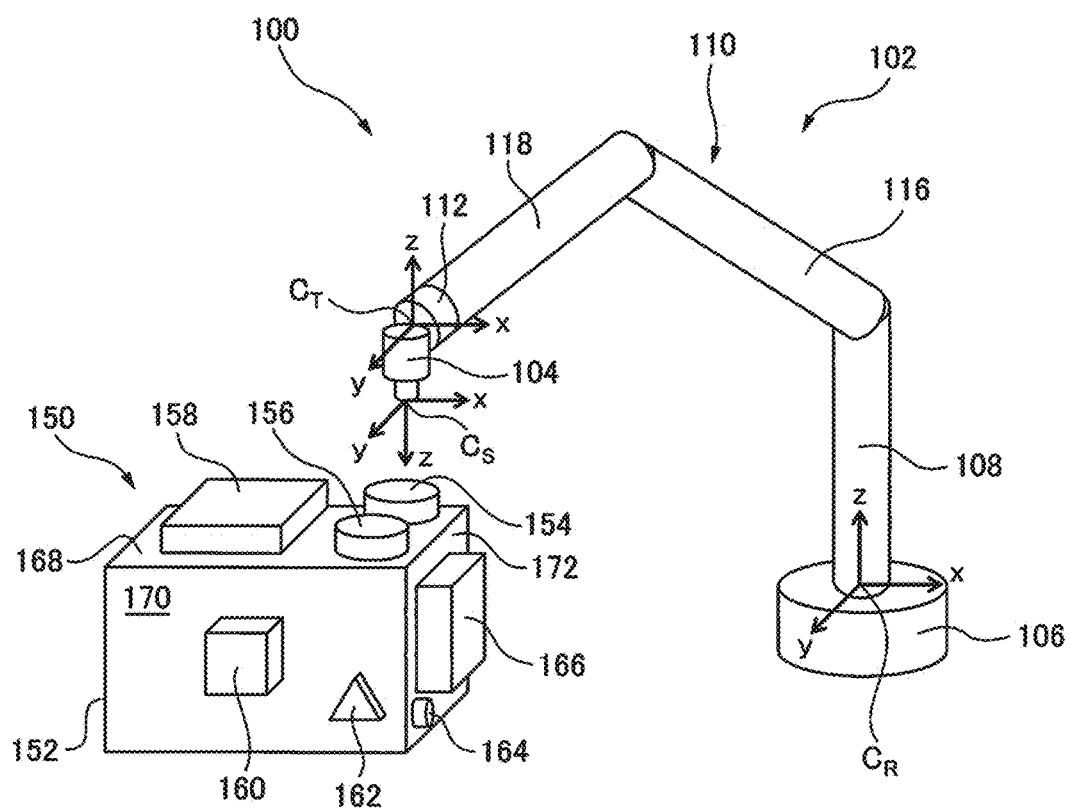
FIG. 2 illustrates a robot system and a workpiece according to one embodiment.

The workpiece model 150M is three dimensional CG which models the workpiece 150 illustrated in FIG. 2, and includes a main body model 152M and part models 154M, 156M, 158M, 160M, 162M, 164M, and 166M.

Then, the processor 12 sets a workpiece coordinate system $C_W$ for the workpiece model 150M. In the example illustrated in FIG. 4, the workpiece coordinate system $C_W$ is set such that the origin thereof is positioned at the left rear corner of an upper face model 168M of the main body model 152M, the x-y plane thereof is parallel to the upper face model 168M, the x-z plane thereof is parallel to a rear face model 170M, and the y-z plane thereof is parallel to a right face model 172M.

In the example illustrated in FIG. 4, the part models 154M, 156M, and 164M have a circular profile, the part models 158M, 160M, and 166M have a quadrangular profile, and the part model 162M has a triangular profile.

The sizes of the part models 154M, 156M, 158M, 160M, 162M, 164M, and 166M are set such that the sizes of the part models 154M and 156M are set to "100," those of the part models 158M and 166M are set to "300," that of the part model 160M is set to "150," that of the part model 162M is set to "80," and that of the part model 164M is set to "20." These sizes may be expressed in units of e.g. m, $m^2$, or $m^3$.

The part model 166M is painted in a color (i.e., black) different from those of the main body model 152M and the part models 154M, 156M, 158M, 160M, 162M, and 164M. The operator can color any portion of the workpiece model 150M, as the part model 166M, by operating the data input section 20.

In this way, a robot system model 100M including a robot model 102M and an imaging section model 104M, and a workpiece model 150M are arranged in the virtual space 200, as illustrated in FIG. 4.

Thus, in this embodiment, the processor 12 functions as a model arrangement section 26 (FIG. 1) configured to arrange the workpiece model 150M, the robot model 102M, and the imaging section model 104M in the virtual space 200. The processor 12 generates the virtual space 200 as image data, and displays is on the display 22 as an image of the virtual space 200 as illustrated in FIG. 4.

In step S2, the processor 12 receives an extraction condition. The extraction condition is for specifying a portion to be extracted when extracting a target portion from the workpiece model 150M in step S3 described later.

The "target portion" in the present disclosure indicates a portion (i.e., the part models 154M, 156M, 158M, and 160M) of the workpiece model 150M, which corresponds to a portion of the workpiece 150 to be imaged (i.e., the parts 154, 156, 158, and 160) by the imaging section 104 in the real space.

In this embodiment, the extraction condition includes a first condition for specifying the shape, the color, and the size of the target portion. As an example, the processor 12 generates image data showing fields of "Shape," "Color," and "Size" of the target portion, and displays it on the display 22.

The operator operates the data input section 20 so as to input the shape of the target portion to be extracted in following step S3 into the "Shape" field, as e.g. "Circular," "Triangular," or "Quadrangular".

The operator operates the data input section 20 so as to input the color of the target portion to be extracted in following step S3 into the "Color" field, as e.g. "White," "Black," or "Blue".

The operator operates the data input section 20 so as to input the range of the sizes of the target portion to be extracted in following step S3 into the "Size" field, as e.g. "100 to 200". The operator can thus input a first condition for specifying a target portion on the workpiece model 150M to be extracted.

Further, in this embodiment, the extraction condition includes a second condition for specifying the shape, the color, or the size of a portion of the workpiece model 150M, which corresponds to a portion of the workpiece 150 not to be imaged by the imaging section 104 in the real space.

As an example, the processor 12 generates Image data showing fields of "Shape," "Color," and "Size" of a portion to be excluded from an imaging-target, and displays it on the display 22. The operator operates the data input section 20 so as to input the shape of the portion not to be extracted in following step S3 into the "Shape" fields, as e.g. "Circular," "Triangular," or "Quadrangular".

The operator operates the data input section 20 so as to input the color of the portion not to be extracted in step S3 into the "Color" field, as e.g. "White," "Black," or "Blue".

The operator operates the data input section 20 so as to input the range of the size of the portion not to be extracted in step S3 into the "Size" field, as e.g. "500 to 600". In this way, the operator can input the second condition for specifying the portion of the workpiece model 150M not to be extracted.

Below, a case is described in which the operator inputs "Circular" and "Quadrangular" into the "Shape" field, and "90 to 350" into the "Size" field, as the first condition of the extraction condition, while the operator inputs "Black" into the "Color" field as the second condition of the extraction condition.

The data input section 20 receives the input of the extraction condition from the operator, and transmits it to the processor 12 via the I/O interface 18. The processor 12 stores the received extraction condition in the system memory 14. Thus, in this embodiment, the data input section 20 functions as an extraction condition receiving section 28 (FIG. 1) configured to receive the input of the extraction condition.

In step S3, the processor 12 extracts a target portion in accordance with the extraction condition received in step S2. More specifically, the processor 12 refers to the first condition (i.e., "Shape"="Circular" or "Quadrangular" and "Size"="90 to 350") included in the extraction condition received in step S2, and extracts a portion of the workpiece model 150M, which matches the first condition, as the target portion.

In the workpiece model 150M illustrated in FIG. 4, the part models 154M, 156M, and 164M have a "Circular" shape, and the part models 158M, 160M, and 166M have a "Quadrangular" shape. Further, in the workpiece model 150M, the part models 154M, 156M, 158M, 160M, and 166M have a size of "90 to 350."

Therefore, the part models 154M, 156M, 158M, 160M, and 166M of the workpiece model 150M match the first condition of the extraction condition.

On the other hand, the processor 12 refers to the second condition (i.e., "Color"="Black") included in the extraction condition received in step S2, and does not extract a portion of the workpiece model 150M, which matches the second condition, as the target portion.

In the example illustrated in FIG. 4, the part model 166M is painted in black by the operator. Therefore, the processor 12 excludes the part model 166M from the target portion.

As a result, the processor 12 extracts the part models 154M, 156M, 158M, and 160M of the workpiece model 150M as the target portions. The processor 12 can extract the target portions which match the extraction condition from the workpiece model 150M by comparing drawing data (e.g., 3D CAD data) of the workpiece model 150M with the extraction condition.

Thus, in this embodiment, the processor 12 functions as a target-portion extracting section 30 (FIG. 1) configured to extract the target portions 154M, 156M, 158M, and 160M in accordance with the extraction condition.

In step S4, the processor 12 calculates an imaging position. More specifically, the processor 12 calculates, as a first imaging position, the position of the imaging section model 104M with respect to the workpiece model 150M, where the target portion 154 is within the field of view of the imaging section model 104M.

Figure 5:
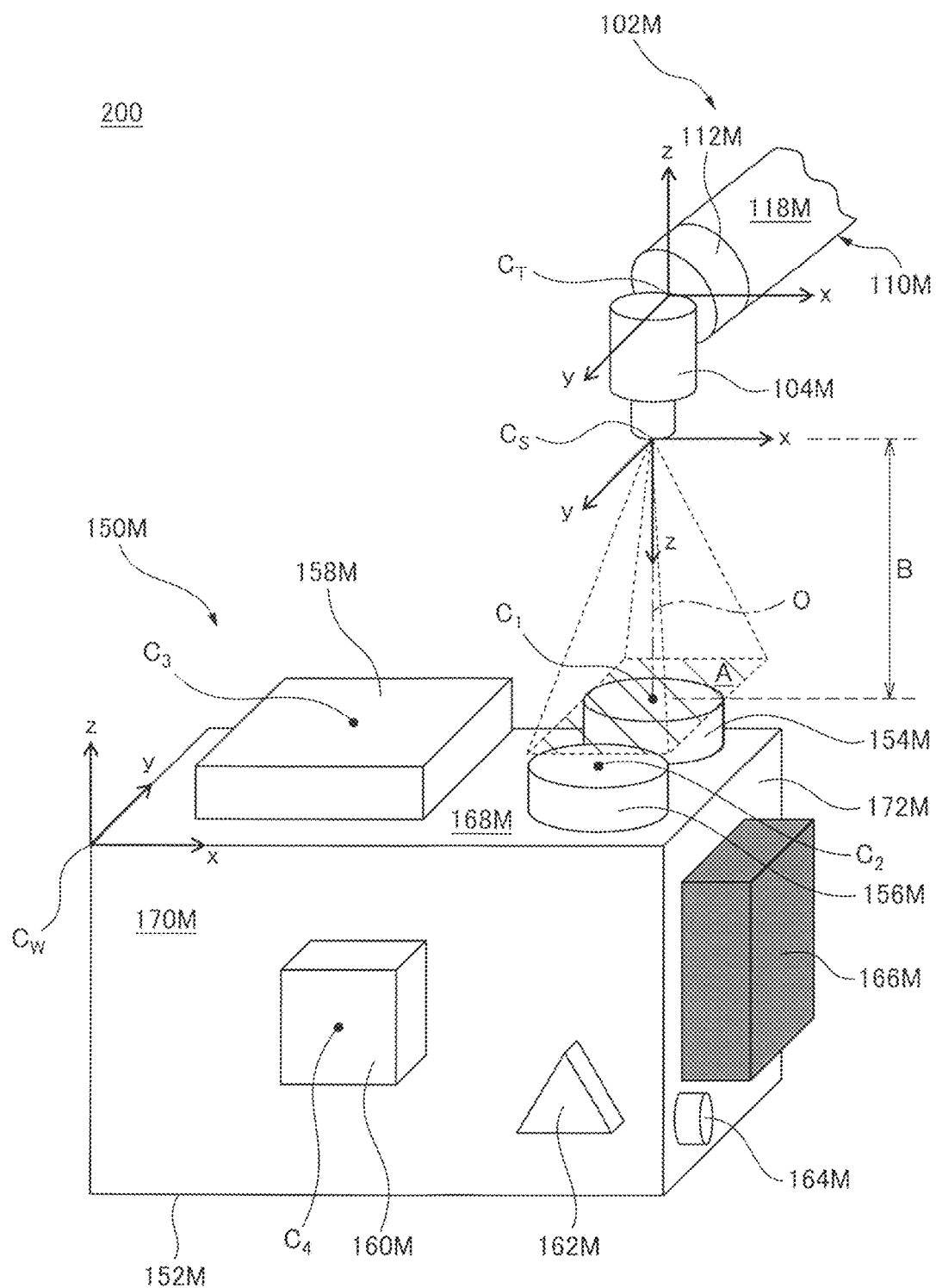
FIG. 5 is an enlarged view illustrating how an imaging section model is placed at a first imaging position relative to a workpiece.

The real imaging section 104 has a field of view indicating the range can be imaged, and a height of the field of view. FIG. 5 represents a field of view A of the imaging section model 104M, which corresponds to the field of view of the imaging section 104. The size of the field of view A and the height B of the field of view of the imaging section model 104M can be defined by e.g. the number of pixels of the image sensor and the specifications of the optical system of the real imaging section 104.

Alternatively, the operator may designate the size of the field of view A and the height B of the field of view of the imaging section model 104M in advance, by operating the data input section 20. In this embodiment, the height B of the field of view coincides with the distance between the center of the field of view A and the origin of the sensor coordinate system $C_S$.

The processor 12 calculates, as the first imaging position, the relative position of the workpiece model 150M and the imaging section model 104M illustrated in FIG. 5. When the workpiece model 150B and the imaging section model 104M are arranged at the first imaging position as illustrated in FIG. 5, the visual line O (i.e., the z-axis of the sensor coordinate system) of the imaging section model 104M passes through the center $C_1$ of the target portion 154M.

In addition, the distance between the imaging section model 104M and the target portion 154M in the direction of the visual line O coincides with the height B of the field of view. In addition, the x-y plane of the sensor coordinate system $C_S$ (i.e., the x-y plane of the tool coordinate system $C_T$) is parallel to that of the workpiece coordinate system.

The processor 12 calculates the position of the center $C_1$ in the robot coordinate system $C_R$, based on the position of the workpiece coordinate system $C_W$ in the robot coordinate system $C_R$ and the position of the center $C_1$ in the workpiece coordinate system $C_W$. Then, the processor 12 calculates the position and orientation (i.e., the origin position and the direction of each axis) of the sensor coordinate system $C_S$ corresponding to the first imaging position, based on the calculated position of the center $C_1$ and the height B of the field of view.

Similarly, the processor 12 calculates, as a second imaging position, the position of the imaging section model 104M with respect to the workpiece model 150M, where the target portion 156M is within the field of view A of the imaging section model 104M.

When the workpiece model 150M and the imaging section model 104M are arranged at the second imaging position, the visual line O of the imaging section model 104M passes through the center $C_2$ of the target portion 156M, and the distance between the imaging section model 104M and the target portion 156M in the direction of the visual line O coincides with the height B of the field of view. In addition, the x-y planes of the sensor coordinate system $C_S$ and the workpiece coordinate system $C_W$ are parallel to each other.

The processor 12 calculates, as a third imaging position, the position of the imaging section model 104M with respect to the workpiece model 150M, where the target portion 158M is within the field of view A of the imaging section model 104M.

When the workpiece model 150M and the imaging section model 104M are arranged at the third imaging position, the visual line O of the imaging section model 104M passes through the center $C_3$ of the target portion 158M, and the distance between the imaging section model 104M and the target portion 158M in the direction of the visual line O coincides with the height B of the field of view. In addition, the x-y planes of the sensor coordinate system $C_S$ and the workpiece coordinate system $C_W$ are parallel to each other.

The processor 12 calculates, as a fourth imaging position, the position of the imaging section model 104M with respect to the workpiece model 150M, where the target portion 160M is within the field of view A of the imaging section model 104M.

When the workpiece model 150M and the imaging section model 104M are arranged at the fourth imaging position, the visual line O of the imaging section model 104M passes through the center $C_4$ of the target portion 160M, and the distance between the imaging section model 104M and the target portion 160M in the direction of the visual line O coincides with the height B of the field of view. In addition, the x-y plane of the sensor coordinate system $C_S$ is parallel to the x-z plane of the workpiece coordinate system $C_W$.

In this way, the processor 12 calculates the $n^{th}$ imaging position (n=1, 2, 3, 4) corresponding to all the target portions 154M, 156M, 158M and 160M extracted in step S3, and stores them in the system memory 14. Therefore, in this embodiment, the processor 12 functions as an imaging-position calculating section 32 (FIG. 1) configured to calculate the imaging position.

The operator may pre-set the condition of the $n^{th}$ imaging position (i.e., the condition that the visual line O of the imaging section model 104M passes through the center $C_n$, that the distance between the imaging section model 104M and the target portion 154M coincides with the height B of the field of view, or that the plane defined by the sensor coordinate system $C_S$ is parallel to that defined by the workpiece coordinate system $C_W$) by operating the data input section 20.

In step S5, the processor 12 simulates an operation of positioning the imaging section model 104M at the $n^{th}$ imaging position with respect to the workpiece model 150M. Step S5 will be described below with reference to FIG. 6. In step S11, the processor 12 sets the number "n" for specifying the imaging position to "1."

In step S12, the processor 12 positions the imaging section model 104M and the workpiece model 150M at the $n^{th}$ imaging position. If n=1 is set at the start of step S12, the processor 12 simulatively operates the robot model 102M so as to move the imaging section model 104M in the virtual space 200, and positions the imaging section model 104M at the first imaging position with respect to the workpiece model 150M. As a result, the imaging section model 104M is positioned at the first imaging position with respect to the workpiece model 150M as illustrated in FIG. 5.

In step S13, the processor 12 acquires $n^{th}$ positional data of the robot model 102M when the imaging section model 104M is positioned at the $n^{th}$ imaging position with respect to the workpiece model 150M in step S12.

As an example, the processor 12 acquires, as $n^{th}$ positional data, data of the position and orientation (i.e., the origin position and the direction of each axis) of the tool coordinate system $C_T$ in the robot coordinate system $C_R$ when the imaging section model 104M is positioned at the $n^{th}$ imaging position with respect to the workpiece model 150M, and stores it in the system memory 14.

Alternatively, the processor 12 acquires, as $n^{th}$ positional data, the rotation angle of each movable component model (i.e., the rotary body model 108M, an upper arm model 116M, a lower arm model 118M, and the wrist model 112M) of the robot model 102M when the imaging section model 104M and the workpiece model 150M are positioned at the $n^{th}$ imaging position, and stores it in the system memory 14.

In step S14, the processor 12 increments the number "n" for specifying the imaging position by "1" (i.e., n=n+1).

In step S15, the processor 12 determines whether the number "n" for specifying the imaging position is larger than $n_D$, where $n_D$ is the number of the target portions extracted in step S3. In this embodiment, $n_D=4$.

Figure 6:
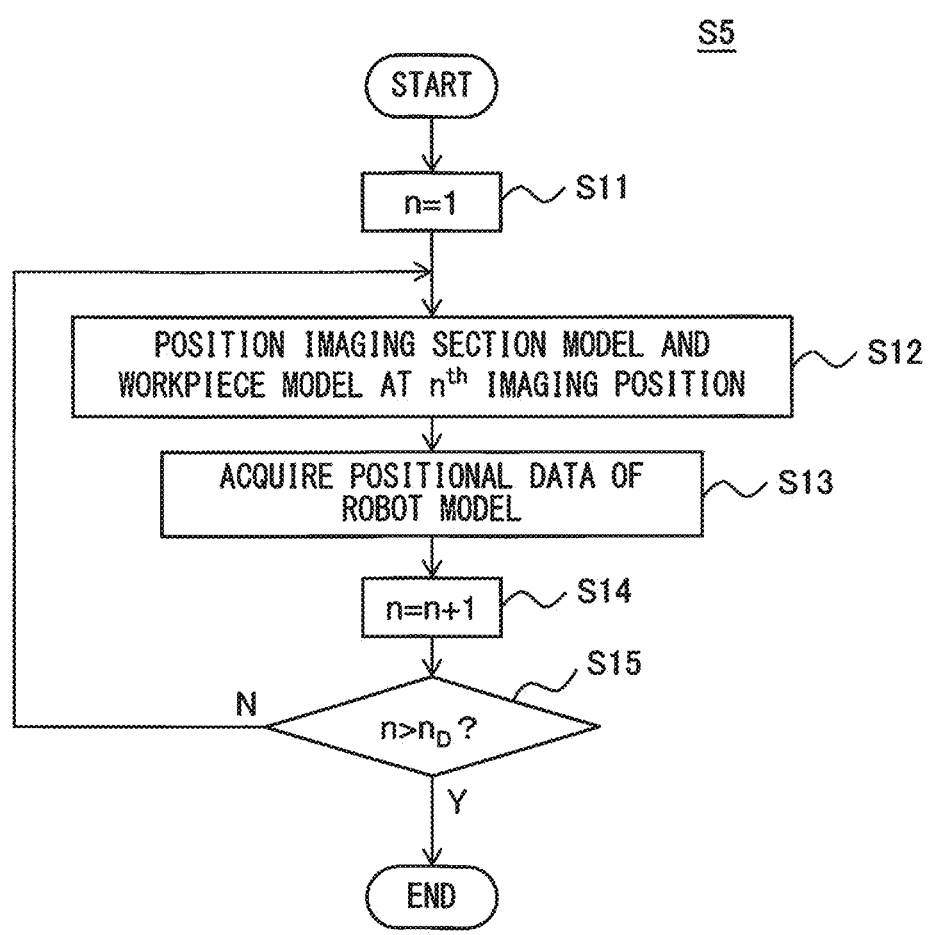
FIG. 6 is a flowchart illustrating one exemplary sequence in step S5 of FIG. 3.

When the number "n" is larger than $n_D$ (i.e., $n > n_D$), the processor 12 determines YES, ends step S5 illustrated in FIG. 6, and advances to step S6 illustrated in FIG. 3. On the other hand, when the number "n" is equal to or less than $n_D$ (i.e., $n \leq n_D$), the processor 12 determines NO and returns to step S12. In this way, the processor 12 carries out the loop of steps S12 to S15 until it determines YES in step S15.

In this manner, the processor 12 simulates the operation of positioning the imaging section model 104M at the $n^{th}$ imaging position with respect to the workpiece model 150M, and acquires $n^{th}$ positional data of the robot model 102M when positioning the imaging section model 104M at $n^{th}$ imaging position. Therefore, the processor 12 functions as a simulating section 34 (FIG. 1) configured to simulate the positioning operation.

Referring again to FIG. 3, in step S6, the processor 12 generates an operation program for the robot system 100, based on the $n^{th}$ positional data (n=1 to 4) acquired in step S13. More specifically, the processor 12 determines the $n^{th}$ positional data as a teaching point at which the real robot 102 is to be positioned, thereby generates an operation program of a series of operations of the real robot system 100 as described above.

The operation program causes the real robot 102 to carry out the same operation as that of positioning the imaging section model 104M at the $n^{th}$ imaging position relative to the workpiece model 150M in the simulation in step S5. Accordingly, the robot 102 can position the imaging section 104 at the $n^{th}$ imaging position with respect to the workpiece 150.

Further, the operation program causes the imaging section 104 to carry out an imaging operation to image the part 154, 156, 158, or 160 of the workpiece 150, which are to be imaged, each time the robot 102 positions the imaging section 104 at the $n^{th}$ imaging position relative to the workpiece 150. In this way, it is possible to acquire the images of the parts 154, 156, 158, and 160 to be imaged.

As described above, in this embodiment, the processor 12 automatically extracts the target portions (154M, 156M, 158M, and 160M) on the workpiece model 150M (step S3), and simulates the positioning operation to the extracted target portion (step S5).

Then, the processor 12 automatically acquires $n^{th}$ positional data in the simulation (step S13), and generates the operation program for the real robot system 100 using the $n^{th}$ positional data.

According to this configuration, it is possible to carry out teaching for the operation program of a series of operations of the robot system 100 without depending on the operator's experience, the time taken to start up the system can be considerably reduced.

Further, in this embodiment, the extraction condition includes the first condition for specifying the shape, the color, and the size of the target portion (154M, 156M, 158M, 160M). According to this configuration, the operator can easily select the portion of the workpiece model 150M to be extracted, by designating its shape, color, and size.

Further, in this embodiment, the extraction condition includes the second condition for specifying the shape, the color, or the size of the portion of the workpiece model 150M excluded from the target. According to this configuration, the operator can easily exclude the portion of the workpiece model 150, that is not desired to be extracted, from the extraction target, by designating its shape, color, and size.

For example, by painting the portion of the workpiece model 150M not to be extracted in a specific color and designating this specific color as the "Color" in the second condition of the extraction condition, the operator can easily exclude the portion from the extraction target.

Further, in this embodiment, the programming device 10 includes the data input section 20 functioning as the extraction condition receiving section 28 which receives the input of the extraction condition. According to this configuration, since the operator can arbitrary set and input the extraction condition, it is possible to easily designate the target portion in detail.

Further, in this embodiment, the processor 12 calculates the $n^{th}$ imaging position (step S4). According to this configuration, since it is not necessary for the operator to manually designate the $n^{th}$ imaging position and thereby it is possible to automatically calculate the $n^{th}$ imaging position, the time taken to start up the system can be effectively reduced.

Figure 7:
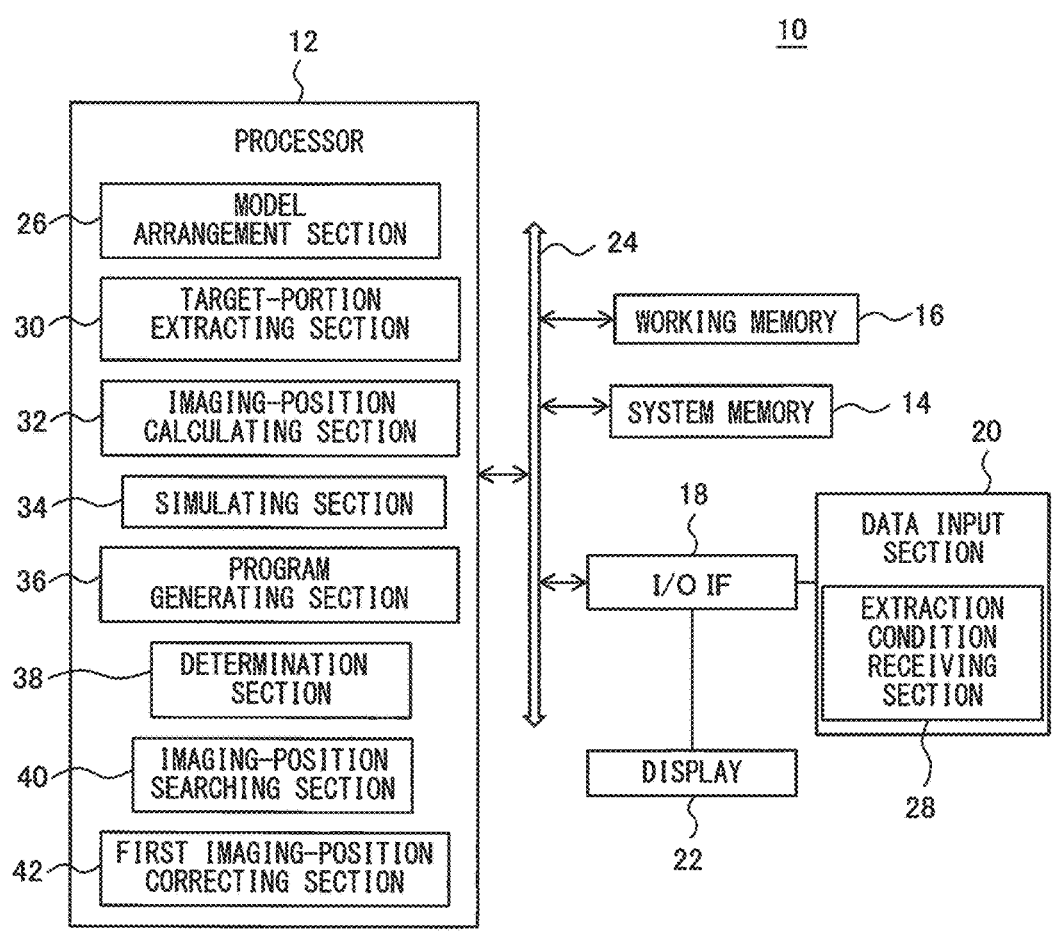
FIG. 7 is a block diagram illustrating a programming device according to another embodiment.

Next, another function of the programming device 10 is described with reference to FIGS. 7 to 10. FIG. 7 is a block diagram illustrating another function of the programming device 10. In this embodiment, the processor 12 further functions as a determination section 38, an imaging-position searching section 40, and a first imaging-position correcting section 42.

Figure 8:
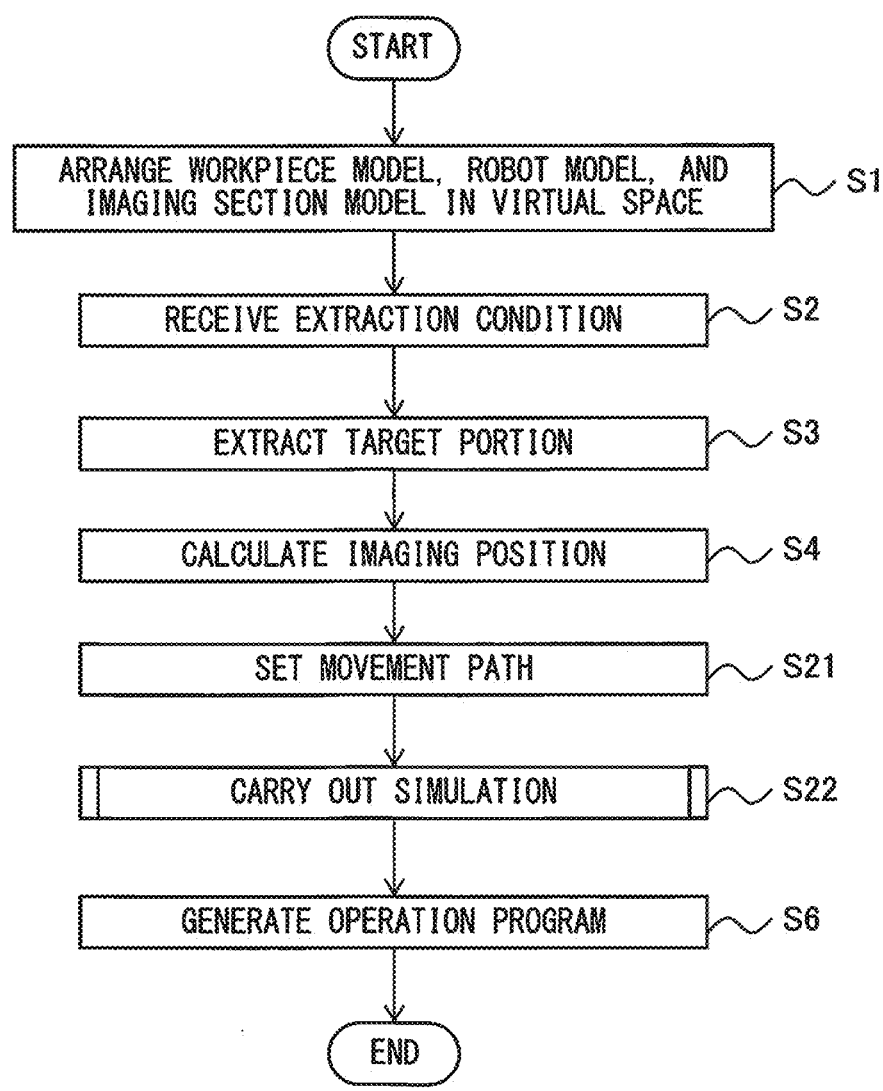
FIG. 8 is a flowchart illustrating one exemplary operation sequence of the programming device illustrated in FIG. 7.
Figure 9:
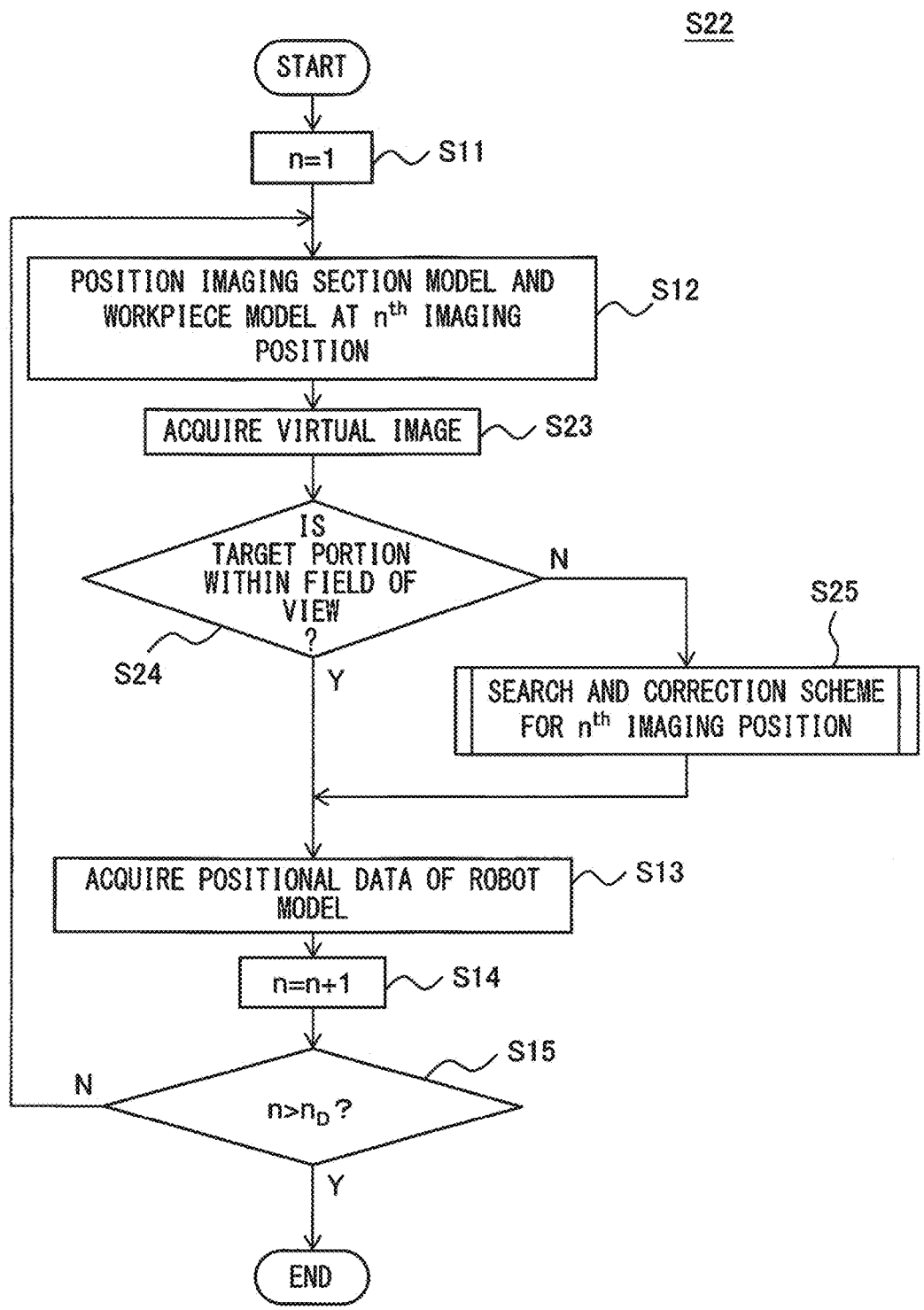
FIG. 9 is a flowchart illustrating one exemplary sequence in step S22 of FIG. 8.

Below, the function of the programming device 10 according to this embodiment will be described with reference to FIG. 8. Note that, in FIG. 8, processes similar as those in the flow illustrated in FIG. 3 are assigned the same step numbers, and repetitive descriptions thereof will be omitted.

After step S4, in step S21, the processor 12 sets a movement path when the robot model 102M moves the imaging section model 104M to each of the first to $n^{th}$ imaging positions with respect to the workpiece model 150M in the simulation carried out in step S22 described later.

The technical meaning of step S21 will be described below. In an actual manufacturing site, in order to reduce the cycle time, the imaging-target portions may be imaged by the imaging section 104 while the robot 102 is moving the imaging section 104. In this case, it is necessary to set the movement path of the imaging section 104 by the robot 102 so as to be smoothly continuous (i.e., without discontinuous sharp corner in the movement path).

In this embodiment, the processor 12 changes each of the first to $n^{th}$ imaging positions calculated in step S4 to new position so as to set a smoothly-continuous movement path when the imaging section model 104M is continuously moved to the first imaging position, the second imaging position, ... the nth imaging position by the robot model 102M in the simulation carried out in step S22 described later.

In step S22, the processor 12 simulates an operation of positioning the imaging section model 104M at the $n^{th}$ imaging position with respect to the workpiece model 150M. Step S22 will be described below with reference to FIG. 9. Note that, in the flow illustrated in FIG. 9, processes similar as those in FIG. 6 are assigned the same step numbers, and repetitive descriptions thereof will be omitted.

After step S12, in step S23, the processor 12 acquires a virtual image. More specifically, the processor 12 generates a virtual image which is within the field of view A of the imaging section model 104M when the robot model 102M positions the imaging section model 104M at the $n^{th}$ imaging position with respect to the workpiece model 150M.

In this step S23, the processor 12 may generate the virtual image while the robot model 102M is moving the imaging section model 104M in step S12.

Figure 10:
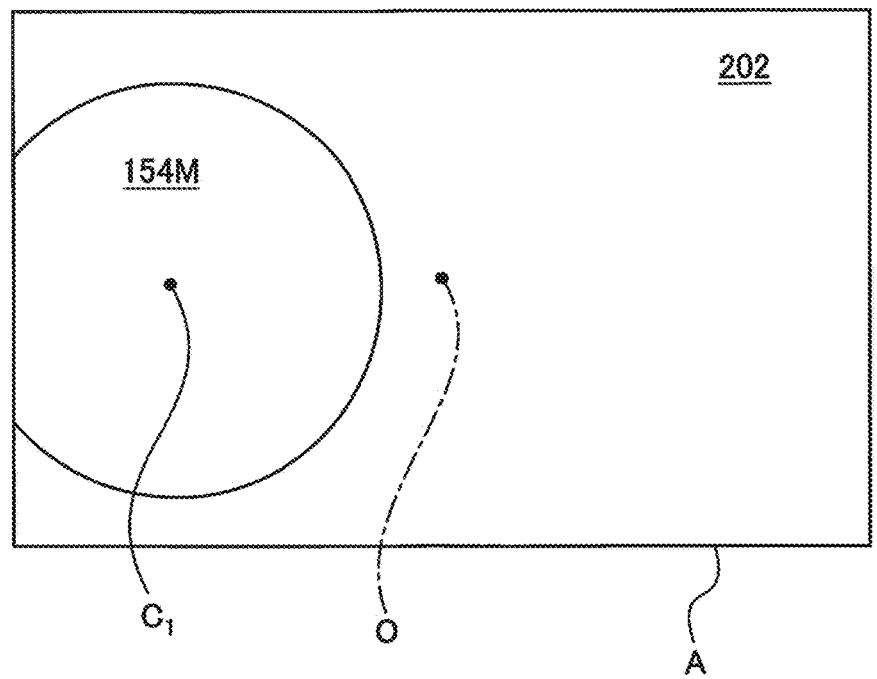
FIG. 10 illustrates an exemplary virtual image which falls within the field of view of the imaging section model.
Figure 11:
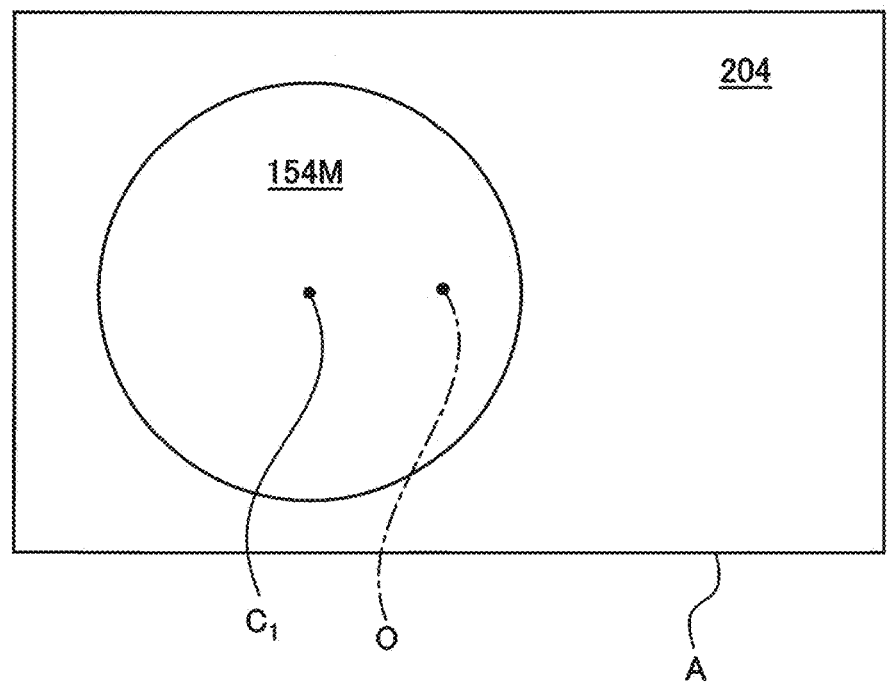
FIG. 11 illustrates another exemplary virtual image which falls within the field of view of the imaging section model.

FIGS. 10 and 11 illustrate virtual images which fall within the field of view A of the imaging section model 104M when the imaging section model 104M is positioned at the first imaging position relative to the workpiece model 150M. For the sake of easy understanding, FIGS. 10 and 11 represent the visual line O of the imaging section model 104M and the center $C_1$ of the target portion 154M.

In a virtual image 202 illustrated in FIG. 10, the target portion 154M is shifted from the center of the virtual image 202 to leftward in the drawing, and a part of the target portion 154M is out of the virtual image 202.

Accordingly, in this case, when the imaging section model 104M is positioned at the first imaging position relative to the workpiece model 150M, the visual line O of the imaging section model 104M does not coincide with the center $C_1$ of the target portion 154M, and a part of the target portion 154M is out of the field of view A of the imaging section model 104M.

On the other hand, in a virtual image 204 illustrated in FIG. 11, although the target portion 154M is shifted from the center of the virtual image 204 to leftward, the entirety of the target portion 154M is within the virtual image 202.

Accordingly, in this case, when the imaging section model 104M is positioned at the first imaging position relative to the workpiece model 150M, the visual line O of the imaging section model 104M does not coincide with the center $C_1$ of the target portion 154M, but the entirety of the target portion 154M is within the field of view A of the imaging section model 104M.

Such situations, in which the visual line O of the imaging section model 104M is shifted from the center $C_1$ of the target portion 154M, may occur by changing the $n^{th}$ imaging position in above-mentioned step S21. In this step S23, the processor 12 generates the virtual image, such as the virtual image 202 or 204, and stores it in the system memory 14.

In step S24, the processor 12 determines whether the target portion 154M, 156M, 158M, or 160M is within the field of view A when the imaging section model 104M and the workpiece model 150M are positioned at the $n^{th}$ imaging position in step S12.

If n=1 is set at the start of step S24, the processor 12 analyzes the virtual image acquired in step S23 and extracts the contour of the target portion 154M shown therein.

On the other hand, the processor 12 reads out the drawing data of the workpiece model 150M from the system memory 14 and acquires from the drawing data the shape of the part model 154M (e.g., the contour shape of an upper face model of the part model 154M) of the target portion.

Then, the processor 12 determines whether the shape of the contour of the target portion 154M shown in the virtual image coincides with that of the part model 154M of the drawing data. When the shape of the target portion 154M shown in the virtual image coincides with that in the drawing data, the processor 12 determines that the target portion 154M is within the field of view A (i.e., determines YES), and advances to step S26.

On the other hand, when the shape of the target portion 154M shown in the virtual image does not coincide with that in the drawing data, the processor 12 determines that the target portion 154M is out of the field of view A (i.e., determines NO), and advances to step S25.

For example, in the case of the virtual image 202 illustrated in FIG. 10, the shape of the contour of the target portion 154M shown in the virtual image is a partially-cut circle, and does not coincide with that (i.e., a perfect circle) of the part model 154M in the drawing data. Therefore, if the processor 12 acquires the virtual image 202 in step S23, it determines NO in step S24.

On the other hand, in the case of the virtual image 204 illustrated in FIG. 11, the shape of the contour of the target portion 154M shown in the virtual image is a perfect circle and coincides with that of the part model 154M in the drawing data. Therefore, if the processor 12 acquires the virtual image 204 in step S23, it determines YES in step S24.

It should be noted that the processor 12 may calculate the degree of similarity between the shape of the contour of the target portion 154M shown in the virtual image and that of the part model 154M in the drawing data, and determine YES when the degree of similarity is equal to or higher than a predetermined threshold. The degree of similarity is a parameter representing the degree of similarity between two shapes, and includes e.g. the area ratio between two shapes.

In this manner, in this embodiment, the processor 12 functions as a determination section 38 (FIG. 7) configured to determine whether or not the target portion 154M, 156M, 158M, or 160M is within the field of view A.

Figure 12:
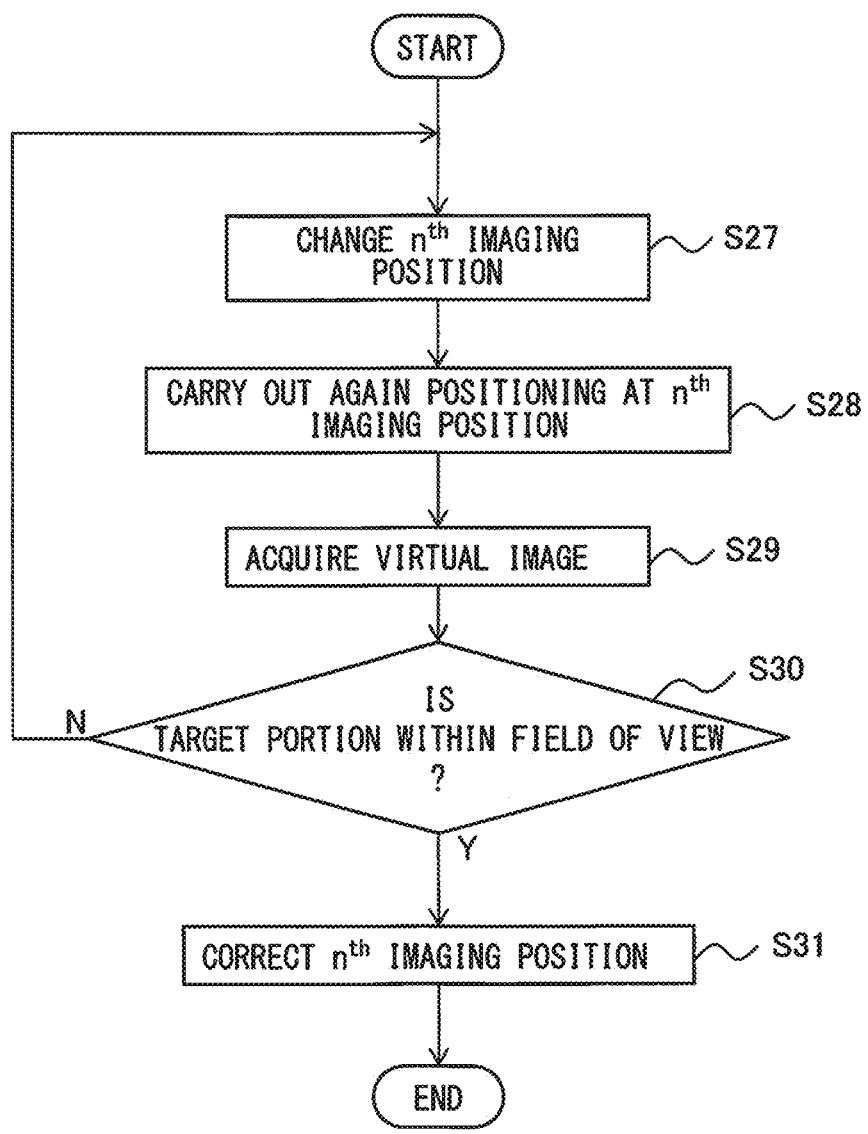
FIG. 12 is a flowchart illustrating one exemplary sequence in step S25 of FIG. 8.

In step S25, the processor 12 executes a search and correction scheme for the $n^{th}$ imaging position. Step S25 will be described below with reference to FIG. 12.

In step S27, the processor 12 changes the $n^{th}$ imaging position. More specifically, the processor 12 changes the $n^{th}$ imaging position set at the start of step S25 to the relative position between the imaging section model 104M and the workpiece model 150M, where the imaging section model 104M arranged at the original $n^{th}$ imaging position is shifted by a predetermined distance $\delta_1$ in the x-axis, y-axis, or z-axis direction of the tool coordinate system $C_T$.

In this way, the processor 12 can change the original $n^{th}$ imaging position set at the start of step S25 to a new $n^{th}$ imaging position. At the changed $n^{th}$ imaging position, the imaging section model 104M is shifted from the original $n^{th}$ imaging position before the change by the distance $\delta_1$ in the x-axis, y-axis, or z-axis direction of the tool coordinate system $C_T$.

In step S28, the processor 12 carries out again the operation of positioning the imaging section model 104M at the $n^{th}$ imaging position with respect to the workpiece model 150M. More specifically, the processor 12 returns the position of the imaging section model 104M to an intermediate position in the movement path heading for the $n^{th}$ imaging position, in the virtual space 200.

Then, the processor 12 simulates the operation of moving and positioning the imaging section model 104M by the robot model 102M from the intermediate position to the changed $n^{th}$ imaging position.

In step S29, the processor 12 acquires a virtual image again, similar as above-mentioned step S23.

In step S30, the processor 12 determines whether the target portion 154M, 156M, 156M, or 160M shown in the virtual image acquired in step S29 is within the field of view A, similar as above mentioned step S24.

When the processor 12 determines YES, it advances to step S31, while it returns to step S27 when determining NO. The processor 12 thus carries out the loop of steps S27 to S30 until it determines YES in step S24.

By repeatedly executing steps S27 to S30 in this way, the processor 12 searches the relative position of the imaging section model 104M and the workpiece model 150M, where the target portion 154M, 156M 158M, or 160M is within the field of view A. Therefore, in this embodiment, the processor 12 functions as an imaging-position searching section 40 (FIG. 7) configured to search this relative position.

In this connection, when the processor 12 changes the $n^{th}$ imaging position in step S27 until it determines YES in step S30, the processor 12 may shift the imaging section model 104M in the x-axis, y-axis, and z-axis directions of the tool coordinate system $C_T$ in accordance with a predetermined order.

For example, the processor 12 may change the $n^{th}$ imaging position in the order in which the imaging section model 104M is shifted in the x-axis direction by 10 times, then, shifted in the y-axis direction by 10 times, and then, shifted in the z-axis direction by 10 times, as the predetermined order.

Further, when the processor 12 changes the $n^{th}$ imaging position in step S27 until it determines YES in step S30, a range [α, β], in which the imaging section model 104M is to be shifted in each axis-direction of the tool coordinate system $C_T$, may be set.

For example, if the range in which the imaging section model 104M is to be shifted in the x-axis direction of the tool coordinate system $C_T$ is set to [−10, 10], the processor 12 shifts the imaging section model 104M in the x-axis direction of the tool coordinate system $C_T$ from the $n^{th}$ imaging position set at the start of step S25, in the range of −10≤×≤10.

Further, when the processor 12 changes the $n^{th}$ imaging position in step S27 until it determines YES in step S30, the processor 12 may receive valid or invalid setting of the changes to shift the imaging section model 104M in the x-axis, y-axis, and z-axis directions of the tool coordinate system $C_T$.

For example, when the change to shift in the z-axis direction is set to "Invalid," the processor 12 does not shift the imaging section model 104M in the z-axis direction of the tool coordinate system $C_T$ when changing the $n^{th}$ imaging position in step S27.

The above-mentioned predetermined order, the range [α, β], and the valid/invalid setting may be predetermined, or the processor 12 may receive input of the predetermined order, the range [α, β], and the valid/invalid setting from the operator via the data input section 20.

In step S31, the processor 12 corrects the $n^{th}$ imaging position set at the start of step S25 to that set at the time when the processor 12 determines YES in step S30, and stores it in the system memory 14.

In this manner, in this embodiment, the processor 12 functions as a first imaging-position correcting section 42 (FIG. 7) configured to correct the $n^{th}$ imaging position, based on the relative position of the imaging section model 104M and the workpiece model 150M searched in steps S27 to S30. Then, the processor 12 ends step S25 illustrated in FIG. 12, and advances to step S13 illustrated in FIG. 9.

As stated above, in this embodiment, when the target portion 154M, 156M, 158M, or 160M is out of the field of view A upon execution of step S23, the processor 12 searches the relative position of the imaging section model 104M and the workpiece model 150M, where the target portion 154M, 156M, 158M, or 160M falls within the field of view A (steps S27 to S30), and corrects the $n^{th}$ imaging position based on this relative position (step S31).

According to this configuration, if the movement path to move the imaging section model 104M by the robot model 102M is set to a smooth path (step S21), it is possible to acquire the $n^{th}$ imaging position where the target portion 154M, 156M, 158M, or 160M reliably falls within the field of view A.

Accordingly, it is possible to effectively generate the operation program for causing the real imaging section 104 to image the portion to be imaged while moving the imaging section 104 by the real robot 102.

Figure 13:
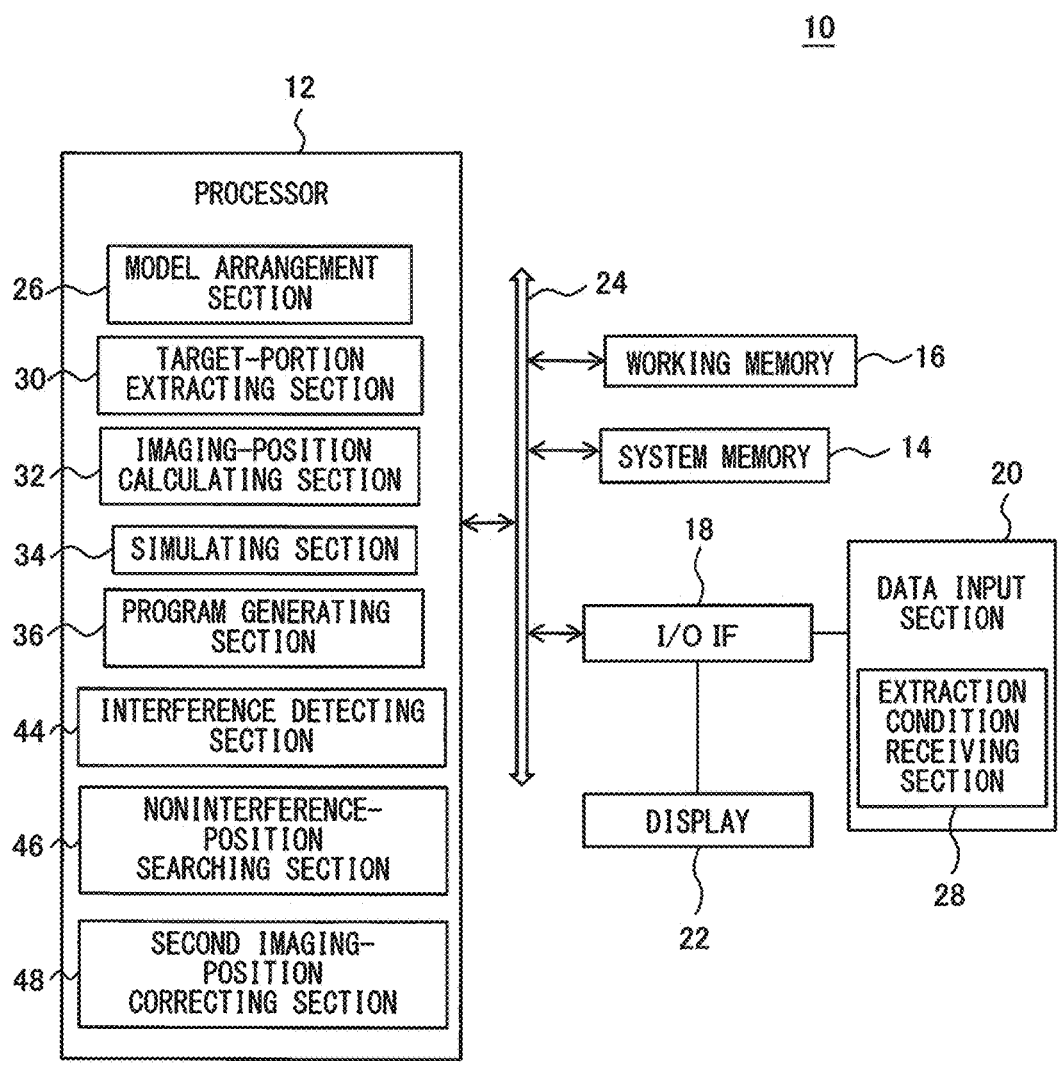
FIG. 13 is a block diagram illustrating a programming device according to still another embodiment.

Next, still another function of the programming device 10 will be described with reference to FIGS. 13 to 17. FIG. 13 is a block diagram illustrating still another function of the programming device 10. In this embodiment, the processor 12 further functions as an interference detecting section 44, a noninterference-position searching section 46, and a second imaging-position correcting section 48.

Figure 14:
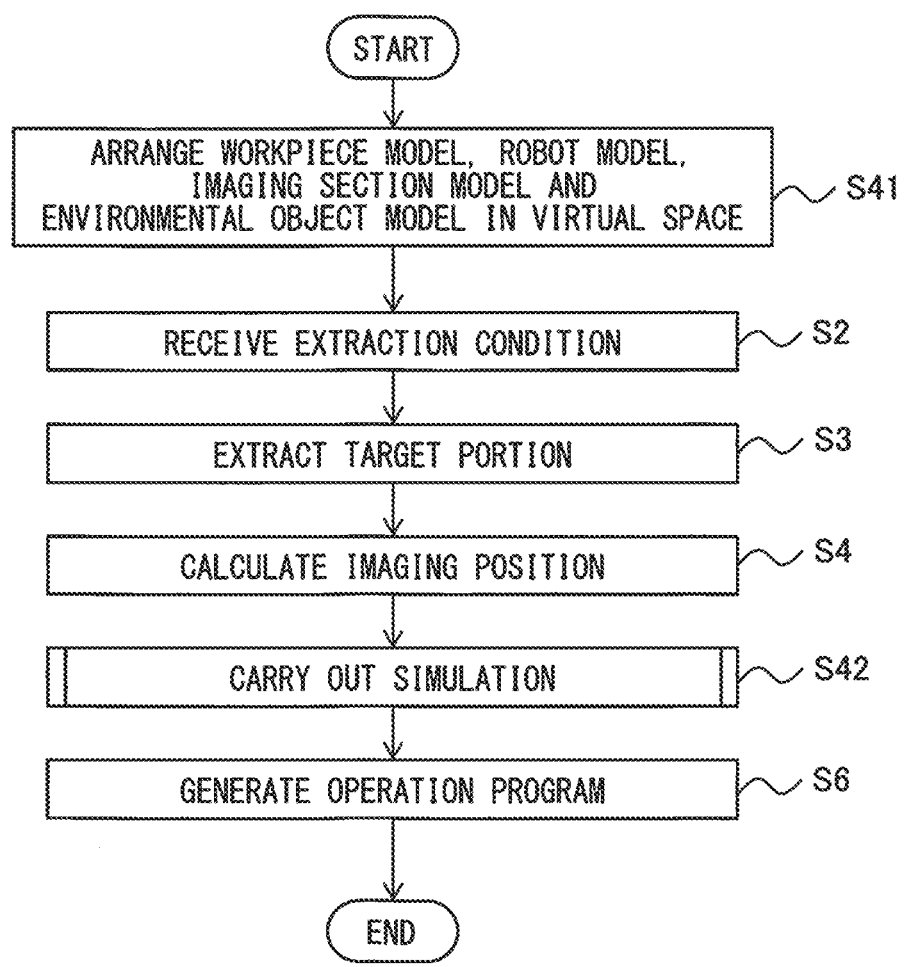
FIG. 14 is a flowchart illustrating one exemplary operation sequence of the programming device illustrated in FIG. 13.

The function of the programming device 10 according to this embodiment will be described below with reference to FIG. 14. Note that, in FIG. 14, processes similar as the flow illustrated in FIG. 3 are assigned the same step numbers, and repetitive descriptions thereof will be omitted.

Figure 15:
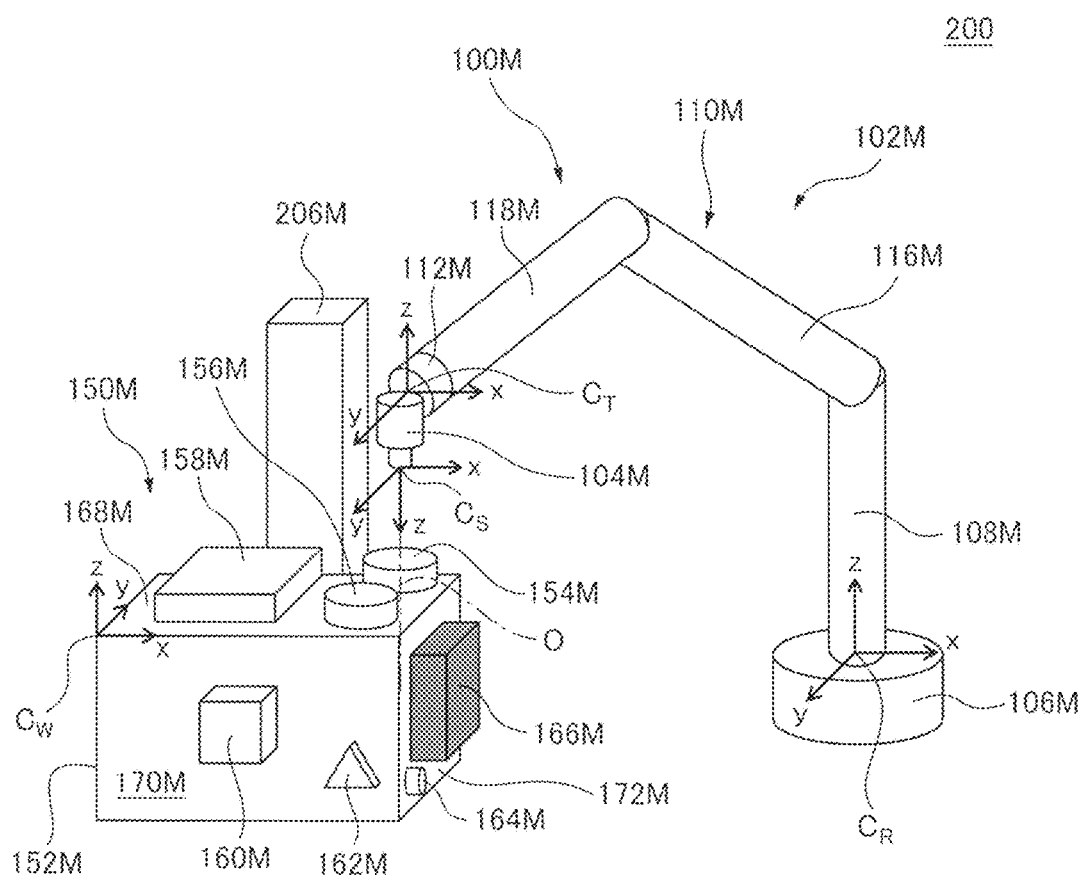
FIG. 15 illustrates one exemplary virtual space generated in step S41 of FIG. 14.
Figure 16:
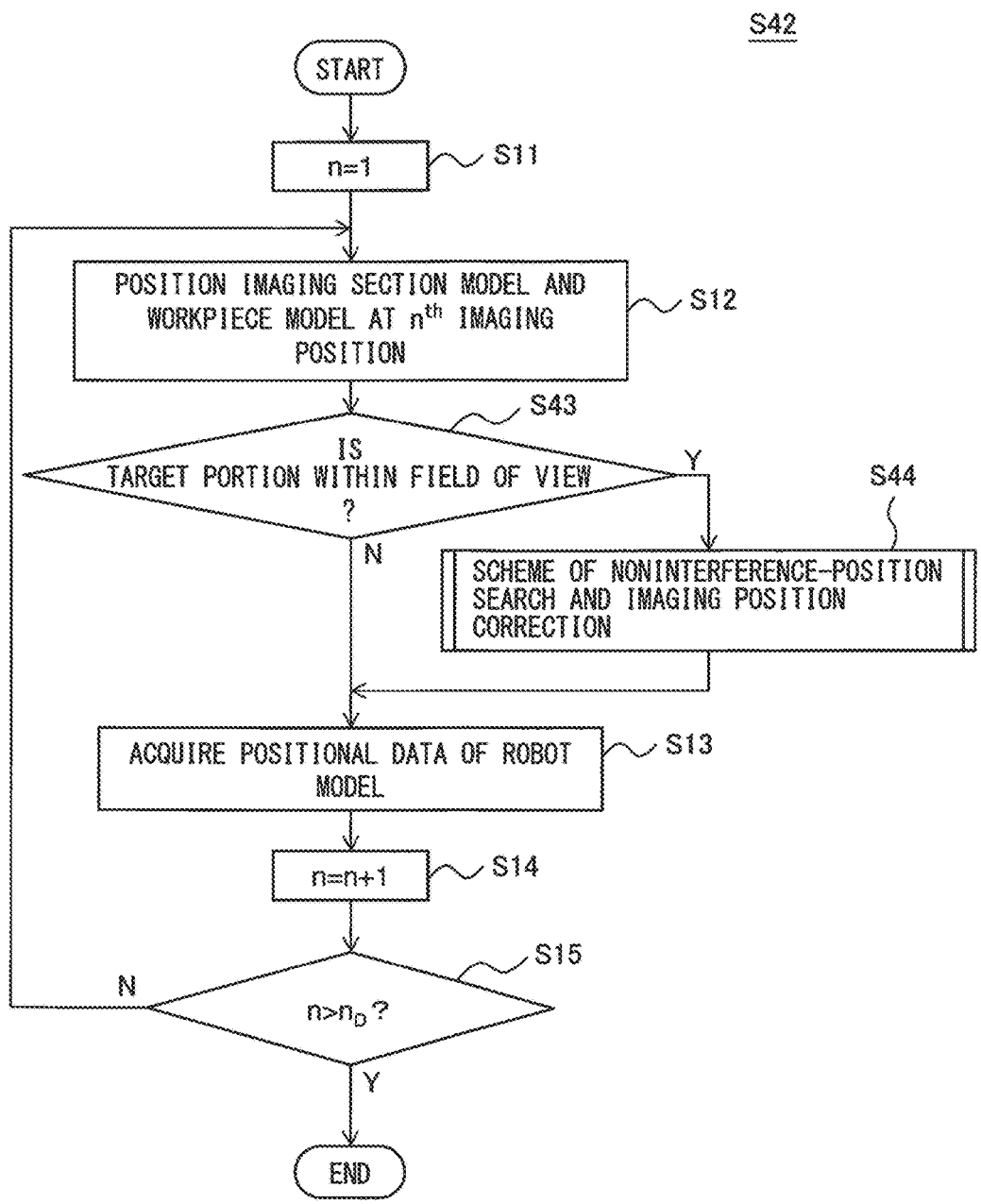
FIG. 16 is a flowchart illustrating one exemplary sequence in step S12 of FIG. 16.
Figure 17:
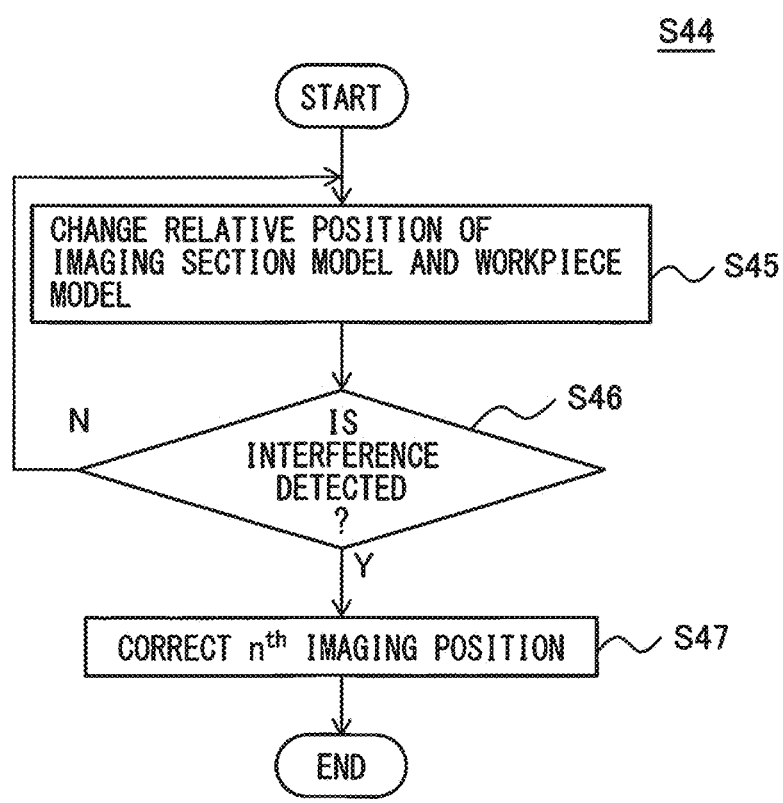
FIG. 17 is a flowchart illustrating one exemplary sequence in step S14 of FIG. 16.

In step S41, the processor 12 functions as the model arrangement section 26 and arranges the workpiece model 150M, the robot model 102M, the imaging section model 104M, and an environmental object model 206M in the virtual space 200. FIG. 15 illustrates an example of the virtual space 200 in this case. The environmental object model 206M is three-dimensional CG modeling an object, such as a pillar or wall of a work cell, which is present around the robot system 100 and the workpiece 150.

After step S4, in step S42, the processor 12 simulates an operation for positioning the imaging section model 104M at the $n^{th}$ imaging position relative to the workpiece model 150M. Step S42 will be described below with reference to FIG. 16. In the flow illustrated in FIG. 16, processes similar as those in FIG. 6 are assigned the same step numbers, and repetitive descriptions thereof will be omitted.

After step S12, in step S43, the processor 12 determines whether interference is detected between the robot model 102M or the imaging section model 104M and the workpiece model 150M or the environmental object model 206M.

More specifically, the processor 12 determines whether the interference occurs between the robot model 102M or the imaging section model 104M and the workpiece model 150M or the environmental object model 206M, based on e.g. the drawing data of the robot model 102M, the imaging section model 104M, the workpiece model 150M, and the environmental object model 206M, and positional data of these elements in the robot coordinate system $C_R$.

When the processor 12 determines that the interference occurs between the robot model 102M or the imaging section model 104M and the workpiece model 150M or the environmental object model 206M (i.e., determines YES), it advances to step S44.

On the other hand, when the processor 12 determines that no interference occurs between the robot model 102M or the imaging section model 104M and the workpiece model 150M or the environmental object model 206M (i.e., determines NO), it advances to step S13.

Thus, in this embodiment, the processor 12 functions as an interference detecting section 44 (FIG. 13) configured to detect the interference between the robot model 102M or the imaging section model 104M and the workpiece model 150M or the environmental object model 206M.

In step S44, the processor 12 executes a scheme of noninterference-position search and imaging position correction. Step S44 will be described below with reference to FIG. 17.

In step S45, the processor 12 changes the relative position of the imaging section model 104M and the workpiece model 150M arranged at the $n^{th}$ imaging position in step S12. More specifically, the processor 12 shifts the imaging section model 104M by a predetermined distance $\delta_2$ in the x-axis, y-axis, or z-axis direction of the tool coordinate system $C_T$.

Alternatively, the processor 12 rotates the imaging section model 104M about the x-axis or y-axis of the tool coordinate system $C_T$ (or the sensor coordinate system $C_S$) by a predetermined angle $\theta$. In this way, the processor 12 can change the position of the imaging section model 104M by the distance $\delta_2$ or the angle $\theta$.

In this connection, the processor 12 changes the position of the imaging section model 104M in this step S45 such that the target portion 154M, 156M, 158M, or 160M falls within the field of view A. For example, the processor 12 changes the position of the imaging section model 104M such that the visual line O of the imaging section model 104M intersects with. the center $C_n$ of the target portion 154M, 156M, 158M, or 160M (or any point on the target portion).

In step S46, the processor 12 determines whether the interference is detected between the robot model 102M or the imaging section model 104M and the workpiece model 150M or the environmental object model 206M, similarly as step S43.

When the processor 12 determines YES, it advances to step S47, while it returns to step S45 when determining NO. In this way, the processor 12 carries out the loop of steps S45 and S46 until it determines YES in step S46.

When it is determined YES in step S46, the robot model 102M or the imaging section model 104M is placed at a non-interference position where it does not interfere with the workpiece model 150M or the environmental object model 206M.

By repeatedly executing steps S45 and S46 in this way, the processor 12 searches the non-interference position where the above-mentioned interference does not occur. Therefore, in this embodiment, the processor 12 functions as a noninterference-position searching section 46 (FIG. 13) configured to search the non-interference position.

In this connection, when the processor 12 repeatedly executes step S45 until it determines YES in step S46, the processor 12 may carry out the operations to shift the imaging section model 104M in the x-axis, y-axis, and z-axis directions of the tool coordinate system $C_T$, and rotate the imaging section model 104M about the x-axis or y-axis of the tool coordinate system $C_T$ (or the sensor coordinate system $C_S$), in accordance with a predetermined order.

Further, when the processor 12 repeatedly executes step S45 until it determines YES in step S46, a range [γ, ε], in which the imaging section model 104M is to be moved in the direction of or about each axis of the tool coordinate system $C_T$, may be set.

For example, when the range in which the imaging section model 104M is to be rotated about the y-axis of the sensor coordinate system. $C_S$ is set to [−10°, 10°], in step S45, the processor 12 rotates the imaging section model 104M about the y-axis of the sensor coordinate system $C_S$ from the position set at the start of step S25, in the range of −10°≤x ≤10°.

The processor 12 may receive valid or invalid setting of the operation of shifting the imaging section model 104M in the x-axis, y-axis, or z-axis direction of the tool coordinate system $C_T$, or rotating the imaging section model 104M about the x-axis or y-axis of the tool coordinate system $C_T$ (or the sensor coordinate system $C_S$), when executing step S45.

For example, if the rotation about the y-axis of the sensor coordinate system $C_S$ is set to "Invalid," the processor 12 does not carry out the rotation about the y-axis of the sensor coordinate system $C_S$ when executing step S45.

The predetermined order, the range [γ, ε], and the valid/invalid setting referred to in step S45 may be predetermined, or the processor 12 may receive input of the predetermined order, the range [γ, ε], and the valid/invalid setting from the operator via the data input section 20.

In step S47, the processor 12 corrects the $n^{th}$ imaging position set at the start of step S44 to the relative position between the imaging section model 104M and the workpiece model 150M set at the time when the processor 12 determines YES in step S46, and stores it in the system memory 14.

Thus, in this embodiment, the processor 12 functions as a second imaging-position correcting section 48 (FIG. 13) configured to correct the $n^{th}$ imaging position, based on the non-interference position searched in steps S45 and S46. After step S47, the processor 12 ends step S44 illustrated in FIG. 17, and advances to step S13 illustrated in FIG. 16.

As described above, in this embodiment, the processor 12 searches the non-interference position where the interference detected in step S43 does not occur (steps S45 and S46), and generates an operation program using the $n^{th}$ imaging position corrected based on the non-interference position (step S6).

According to this configuration, it is possible to generate the operation program for a series of operations of imaging the target portions 154M, 156M, 158M, and 160M by the imaging section 104 so as to prevent the interference between the robot 102 or the imaging section 104 and the workpiece 150 or the environmental object in an environment of a real space where an environmental object is present around the robot system 100.

Figure 18:
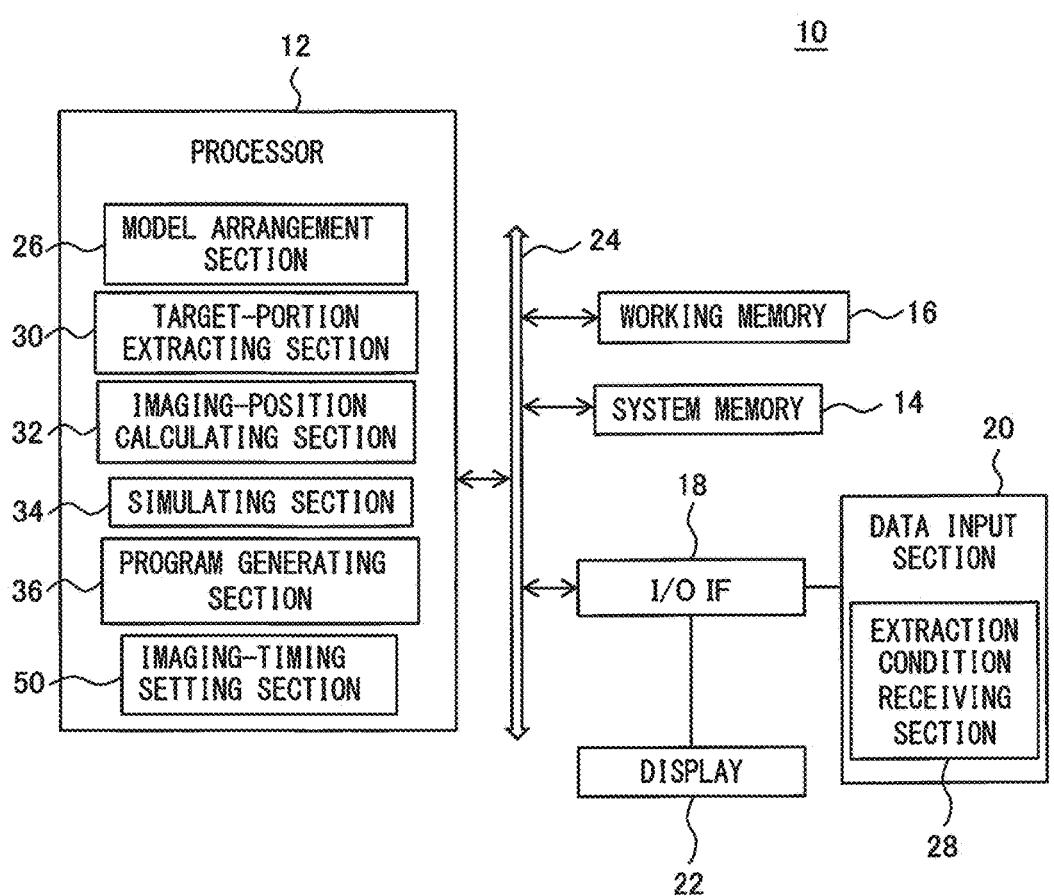
FIG. 18 is a block diagram illustrating a programming device according to still another embodiment.
Figure 19:
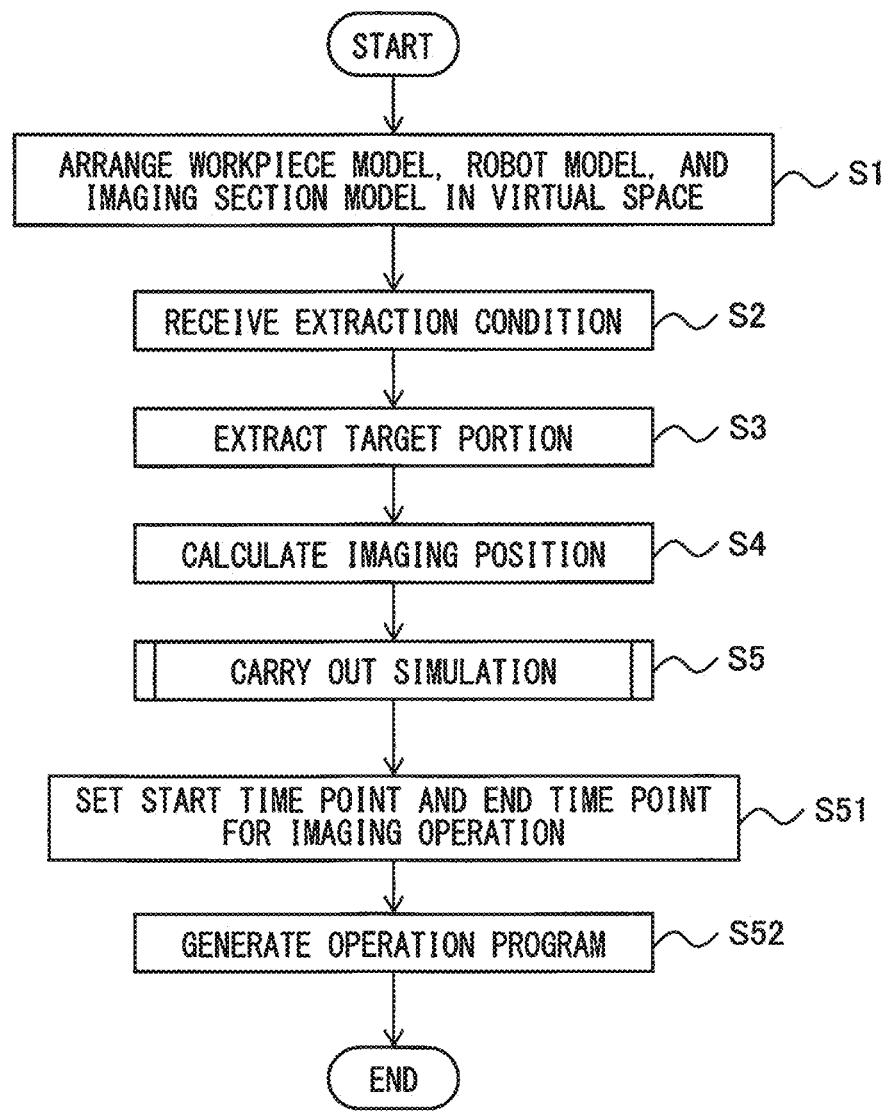
FIG. 19 is a flowchart illustrating one exemplary operation sequence of the programming device illustrated in FIG. 18.

Next, still another function of the programming device 10 will be described with reference to FIGS. 18 and 19. FIG. 18 is a block diagram illustrating still another function of the programming device 10. In this embodiment, the processor 12 further functions as an imaging-timing setting section 50.

The function of the programming device 10 according to this embodiment will be described below with reference to FIG. 19. Note that, in FIG. 19, processes similar as those in FIG. 3 are assigned the same step numbers, and repetitive descriptions thereof will be omitted.

After step S5, in step S51, the processor 12 sets a start time point $t_s$ and an end time point $t_e$ for an imaging operation by the real imaging section 104. As an example, the processor 12 receives designation of a movement speed $V_R$ of the robot 102 when positioning the imaging section 104 at the $n^{th}$ imaging position relative to the workpiece 150.

More specifically, the processor 12 generates image data which allow input of the movement speed $V_R$, and displays it on the display 22. The operator inputs a desired movement speed $V_R$ by operating the data input section 20, and the processor 12 receives the movement speed $V_R$ via the I/O interface 18.

The processor 12 automatically sets the start time point $t_s$ and the end time point $t_e$ of an imaging operation, based on the received movement speed $V_R$. For example, the processor 12 sets the start time point $t_s$ to a time point $t_1$ sec before the imaging section 104 reaches the $n^{th}$ imaging position by the real robot 102, while setting the end time point $t_e$ to a time point $t_2$ sec after the imaging section 104 passes the $n^{th}$ imaging position by the robot 102.

These times $t_1$ and $t_2$ can be calculated from the movement speed $V_R$ of the robot 102. In this way, the processor 12 automatically sets the start time point $t_s$ and the end time point $t_e$, based on the movement speed $V_R$.

As another example, the start time point $t_s$ and the end time point $t_e$ may be arbitrarily designated by the operator. The processor 12 sets the start time point $t_s$ and the end time point $t_e$ in accordance with the designation from the operator, and stores them in the system memory 14. Thus, in this embodiment, the processor 12 functions as an imaging-timing setting section 50 configured to set the start time point $t_s$ and the end time point $t_e$ of an imaging operation.

In step S52, the processor 12 generates an operation program for the robot system 100, based on the $n^{th}$ positional data (n=1 to 4) acquired in step S13 (FIG. 6), and on the start time point $t_s$ and the end time point $t_e$ set in step S51.

More specifically, the processor 12 generates an operation program for causing the imaging section 104 to carry out the imaging operation over a period T from the start time point $t_s$ to the end time point $t_e$ (i.e., $T=t_e-t_s$. For example, T=0.5 sec) set in step S51.

For example, the operation program is generated to start the imaging operation by the imaging section 104 (more specifically, to expose the image sensor to light by opening the shutter) at the time point $t_s$, $t_1$ sec before the imaging section 104 reaches the $n^{th}$ imaging position by the robot 102, and to end the imaging operation of the imaging section 104 (more specifically, to close the shutter) at the time point $t_e$, $t_2$ sec after the imaging section 104 passes the $n^{th}$ imaging position by the robot 102.

According to this embodiment, it is possible reliably capture the portions to be imaged when the portions to be imaged are imaged by the imaging section 104 while moving the imaging section 104 by the robot 102.

Figure 20:
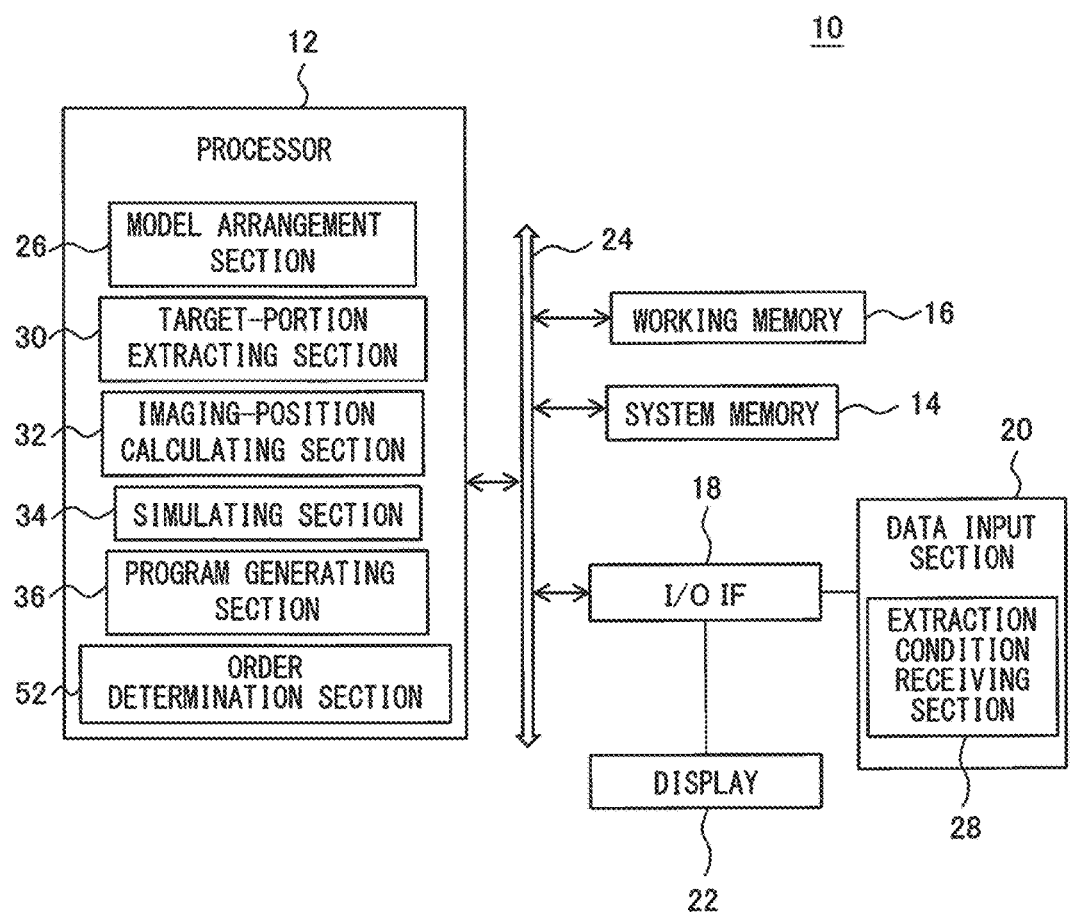
FIG. 20 is a block diagram illustrating a programming device according to still another embodiment.

Next, still another function of the programming device 10 will be described with reference to FIGS. 20 to 23. FIG. 20 is a block diagram illustrating still another function of the programming device 10. In this embodiment, the processor 12 further functions as an order determination section 52.

The function of the programming device 10 according to this embodiment will be described below with reference to FIG. 21. Note that, in FIG. 21, processes similar as those in FIG. 3 are assigned the same step numbers, and repetitive descriptions thereof will be omitted.

After step S5, in step S60, the processor 12 executes a minimum movement path search scheme. Step S60 will be described below with reference to FIG. 22.

Figure 22:
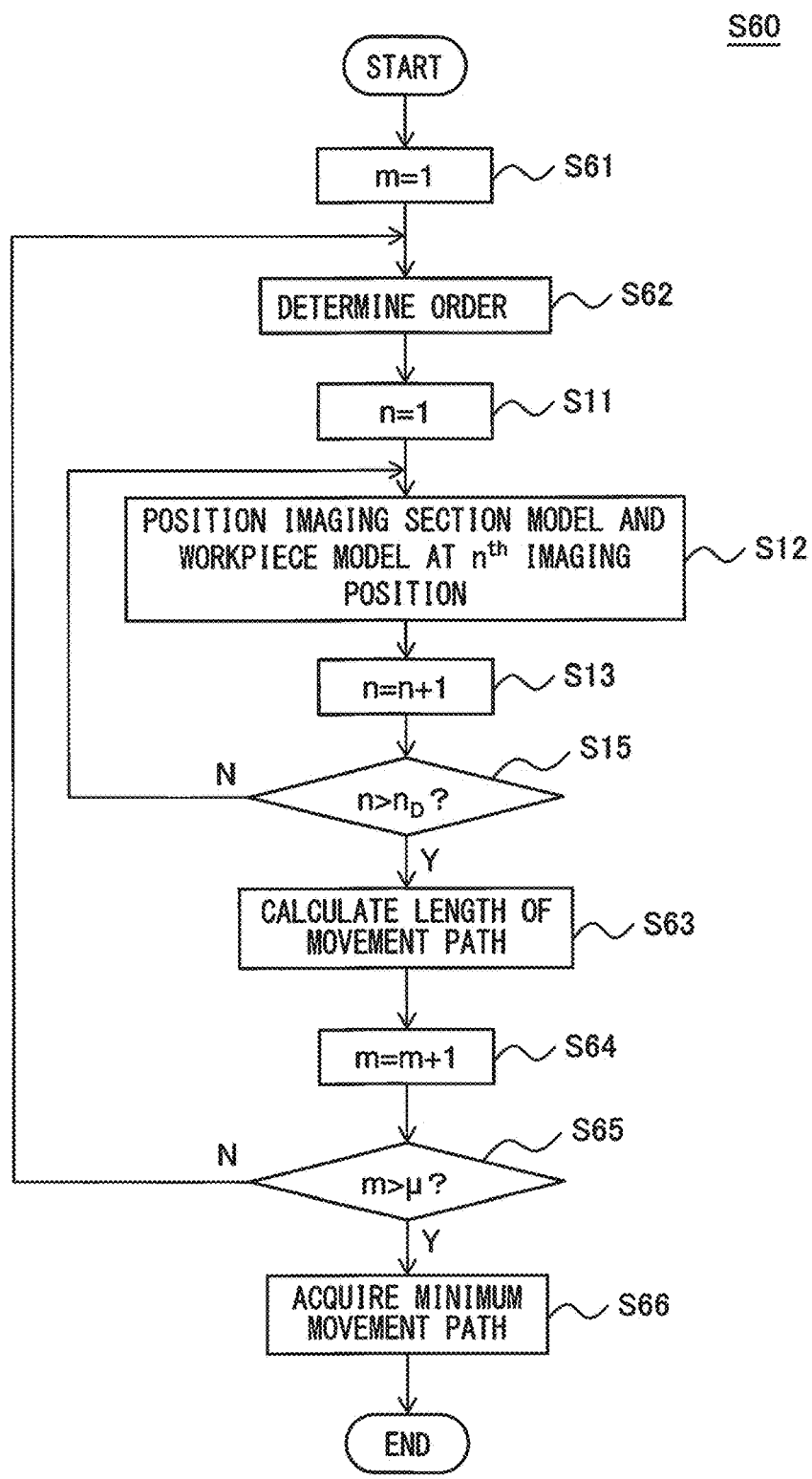
FIG. 22 is a flowchart illustrating one exemplary sequence in step S60 of FIG. 21.

In step S60 illustrated in FIG. 22, a series of operations in steps S62, S11 to S13, S15, and S63 to S65 in FIG. 22 is repeatedly executed for the predetermined number of times μ, until it is determined YES in step S65 described later. The number of times μ is predetermined (e.g., μ=50) by the operator, and stored in the system memory 14.

In step S61, the processor 12 sets the number "m" for specifying the number of times, for which the series of operations in steps S62, S11 to S13, S15, and S63 to S65 of step S60 is executed, to "1."

In step S62, the processor 12 determines the order in which the imaging section model 104M and the workpiece model 150M are positioned at the imaging positions calculated in step S4.

As described above, the first imaging position is set as a position Where the target portion 154M is within the field of view A, the second imaging position is set as a position where the target portion 156M is within the field of view A, the third imaging position is set as a position where the target portion 158M is within the field of view A, and the fourth imaging position is set as a position where the target portion 160M is within the field of view A.

Due to this arrangement, the processor 12 moves the imaging section model 104M in the order of the first imaging position corresponding to the target portion 154, the second imaging position corresponding to the target portion 156, the third imaging position corresponding to the target portion 158, and the fourth imaging position corresponding to the target portion 160, in the simulation (step S5, S22, S42) for moving the imaging section model 104M.

In this embodiment, in step S62, the processor 12 randomly determines this order. More specifically, the number "n" (=1 to 4) for specifying the imaging position is randomly assigned to the target portions 154, 156, 158, and 160.

For example, the processor 12 assigns the number "n" to the target portions 154, 156, 158, and 160 so as to set the position where the target portion 156M is within the field of view A as a first imaging position, set the position where the target portion 160M is within the field of view A as a second imaging position, set the position where the target portion 158M is within the field of view A as a third imaging position, and set the position where the target portion 154M is within the field of view A as a fourth imaging position.

In this case, the processor 12 moves the imaging section model 104M in the order of the first imaging position where the target portion 156M is within the field of view A, the second imaging position where the target portion 160M is within the field of view A, the third imaging position where the target portion 158M is within the field of view A, and the fourth imaging position where the target portion 154M falls within the field of view A, when carrying out the loop of steps S11, S12, S13, and S15 in step S60.

Thus, in this embodiment, the processor 12 functions as the order determination section 52 configured to determine the order for positioning the imaging section model 104M and the workpiece model 150M at the imaging positions.

After step S62, the processor 12 sequentially executes steps S11, S12, S13, and S15, based on the number "n" determined in most-recent step S62, so as to sequentially position the imaging section model 104M at the $n^{th}$ imaging position relative to the workpiece model 150M.

When it is determined YES in step S15, in step S63, the processor 12 calculate the length $L_m$ of the movement path (i.e., the path leading to the first imaging position, the second imaging position, . . . the $n_D^{th}$ imaging position) along which the imaging section model 104M is moved in the most-recent loop of steps S12, S13, and S15. The processor 12 stores the calculated length $L_m$ in the system memory 14.

In step S64, the processor 12 increments the number "m" by "1" (i.e., m=m+1).

In step S65, the processor 12 determines whether the number "m" is larger than μ. When the number "m" is larger than μ (i.e., m>μ), the processor 12 determines YES and advances to step S66.

When the number "m" is equal to or less than μ (i.e., m≤μ), the processor 12 determines NO and returns to step S62. The processor 12 thus carries out the loop of steps S62 to S65 until it determines YES in step S65, so as to sequentially acquire the lengths $L_m$ (m=1, 2, 3, . . . μ) of the movement paths when the imaging section model 104M is moved to the imaging positions in the order randomly determined in step S62.

In step S66, the processor 12 acquires a minimum movement path $P_{MIN}$. More specifically, the processor 12 reads out from the system memory 14 the lengths $L_1$ to $L_μ$ of the movement paths acquired each time step S63 is executed, and compares them with each other to acquire a movement path corresponding to the smallest of the lengths $L_1$ to $L_μ$, as the minimum movement path $P_{MIN}$.

Figure 21:
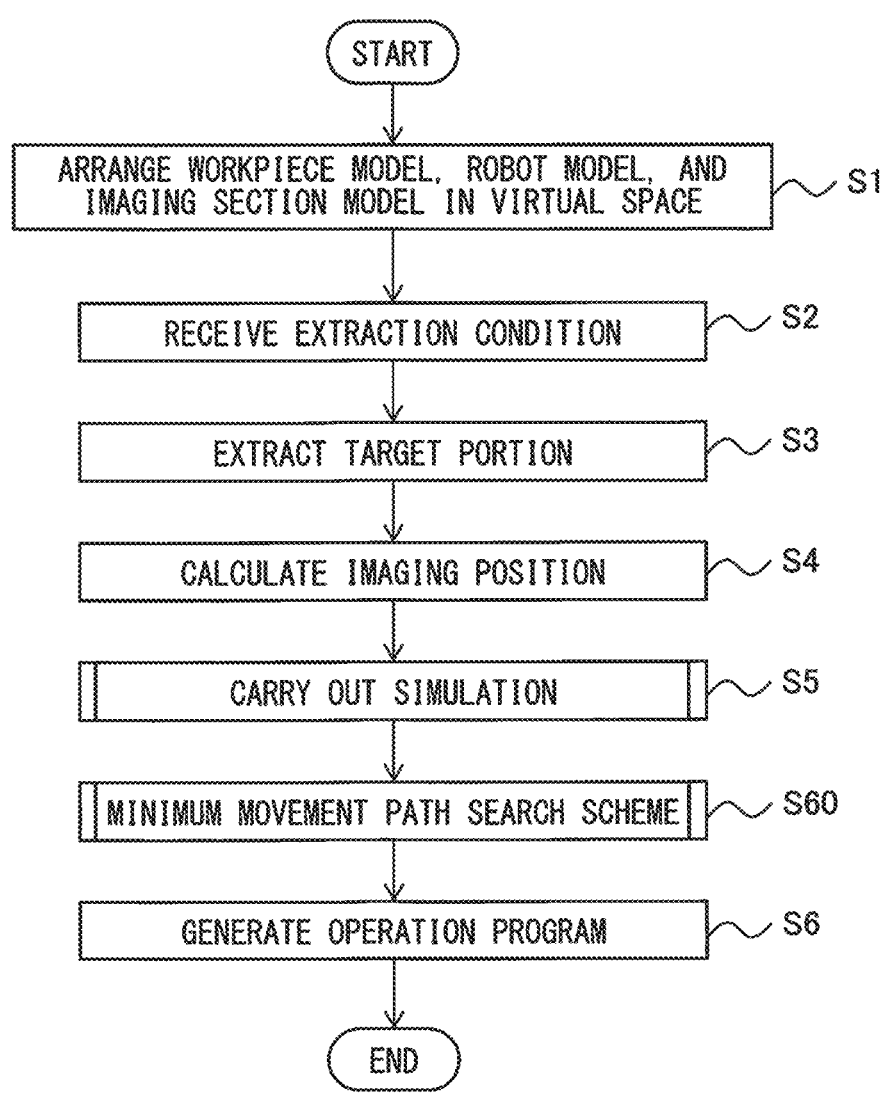
FIG. 21 is a flowchart illustrating one exemplary operation sequence of the programming device illustrated in FIG. 20.

Then, the processor 12 ends step S60 illustrated in FIG. 22, and advances to step S6 in FIG. 21. Then, in step S6, the processor 12 generates an operation program for positioning the imaging section model 104M and the workpiece model 150M at the $n^{th}$ imaging position in the order corresponding to the minimum movement path $P_{MIN}$ acquired in step S66.

According to this embodiment, the processor 12 can automatically generate the operation program for positioning the imaging section model 104M and the workpiece model 150M at each $n^{th}$ imaging position along the minimum movement path $P_{MIN}$. Accordingly, it is possible to minimize the cycle time when the real robot system 100 is operated in accordance with the operation program.

Figure 23:
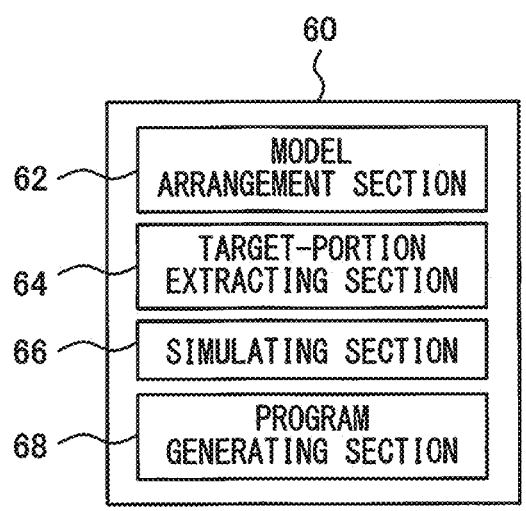
FIG. 23 is a block diagram illustrating a programming device according to still another embodiment.

Next, a programming device 60 according to another embodiment will be described with reference to FIG. 23. The programming device 60 includes a model arrangement section 62, a target-portion extracting section 64, a simulating section 66, and a program generating section 68.

The model arrangement section 62 arranges the workpiece model 150M, the robot model 102M, and the imaging section model 104M in the virtual space 200 (step S1), similarly as the above mentioned model arrangement section 26. The target-portion extracting section 64 extracts the target portions 154M, 156M, 158M, and 160M on the workpiece model 150M in accordance with the predetermined extraction condition (step S3).

The simulating section 66 simulates positioning the imaging section model 104M at the $n^{th}$ imaging position relative to the workpiece model 150M (step S5), similarly as the simulating section 34.

The program generating section 68 generates the operation program for the robot system 100, based on positional data of the robot model 102M acquired in the simulation carried out by the simulating section 66 (step S6), similarly as the program generating section 36.

The programming device 60 may be comprised of a single computer including a processor and a memory (a system memory 14 or a working memory 16). Alternatively, each of the model arrangement section 62, the target-portion extracting section 64, the simulating section 66, and the program generating section 68 may be comprised of a single computer including a processor and a memory.

Note that, as the first or second condition of the extraction condition, a condition for specifying the name of a part model constituting the workpiece model 150M may be added. In this case, the operator may register a name (e.g., "boss A" or "joint B") for each part model by operating the data input section 20.

The model arrangement section 26, 62 may set and use a reference coordinate system $C_D$, in addition to the robot coordinate system $C_R$. The $n^{th}$ imaging position may be set such that the visual line O of the imaging section model 104M passes through any point on the target portion.

In the above-described embodiments, the robot 102 (robot model 102M) moves the imaging section 104 (imaging section model 104M) so as to arrange at the imaging position relative to the workpiece 150 (workpiece model 150M).

However, the workpiece 150 (workpiece model 150M) may be moved by the robot 102 (robot model 102M) and positioned at the imaging position relative to the imaging section 104 (imaging section model 104M). In this case, the workpiece 150 (workpiece model 150M) is connected to the wrist 112 (wrist model 112M).

The features of the embodiments illustrated in FIGS. 1, 7, 13, 18, and 20 may be combined with each other. For example, the interference detecting section 44, the noninterference-position searching section 46, and the second imaging-position correcting section 48 illustrated in FIG. 13 may be added to the embodiment illustrated in FIG. 7. The robot 102 is not limited to a vertical multi-articulated robot, and may be e.g. a parallel-linkage robot or a loader.

While the present disclosure has been described above with reference to embodiments, the above-described embodiments do not limit the invention according to the scope of claims.

The invention claimed is:

1. A programming device which generates an operation program for moving an imaging section or a workpiece by a robot and imaging the workpiece by the imaging section, the programming device comprising:
    a model arrangement section configured to arrange, in a virtual space, a workpiece model modeling the workpiece, a robot model modeling the robot, and an imaging section model modeling the imaging section;
    a target-portion extracting section configured to extract a target portion of the workpiece model, which corresponds to a portion of the workpiece to be imaged, in accordance with a predetermined extraction condition;
    a simulating section configured to move the imaging section model or the workpiece model by the robot model to an imaging position where the imaging section model is to image the target portion extracted by the target-portion extracting section; and
    a program generating section configured to generate an operation program for causing the imaging section to image the portion of the workpiece to be imaged, based on positional data of the robot model when the robot model positions the imaging section model or the workpiece model at the imaging position.

2. The programming device according to claim 1, wherein the extraction condition includes a first condition for specifying a shape, a color, or a size of the target portion,
    wherein the target-portion extracting section extracts, as the target portion, a portion of the workpiece model which matches the first condition.

3. The programming device according to claim 2, wherein the extraction condition includes a second condition for specifying a shape, a color, or a size of a portion of the workpiece model which corresponds to a portion of the workpiece not to be imaged by the imaging section,
    wherein the target-portion extracting section does not extract, as the target portion, the portion of the workpiece model which matches the second condition.

4. The programming device according to claim 1, further comprising an extraction condition receiving section configured to receive an input of the extraction condition.

5. The programming device according to claim 1, further comprising an imaging-position calculating section configured to calculate the imaging position.

6. The programming device according to claim 5, wherein the imaging-position calculating section calculates, as the imaging position, a relative position of the imaging section model and the workpiece model, where:
    a visual line of the imaging section model passes a center of the target portion; and
    a distance between the imaging section model and the target portion coincides with a predetermined height of a field of view of the imaging section.

7. The programming device according to claim 1, further comprising:
    a determination section configured to determines whether or not the target portion is within a field of view of the imaging section while the simulating section moves the imaging section model or the workpiece model by the robot model to the imaging position;

an imaging-position searching section configured to search a relative position of the imaging section model and the workpiece model where the target portion is within the field of view, when the determination section determines that the target portion is out of the field of view; and a first imaging-position correcting section configured to correct the imaging position based on the relative position searched by the imaging-position searching section, wherein the program generating section generates the operation program based on positional data of the robot model when the robot model positions the imaging section model or the workpiece model at the imaging position corrected by the first imaging-position. correcting section.

8. The programming device according to claim 1, wherein the model arrangement section further arranges, in the virtual space, an environmental object model modeling at least one environmental object, wherein the programming device further comprises:

an interference detecting section configured to detect an interference between the robot model or the imaging section model and the workpiece model or the environmental object model while the simulating section moves the imaging section model or the workpiece model by the robot model to the imaging position;

a noninterference-position searching section configured to search a non-interference position where the target portion is within a field of view of the imaging section and the interference does not occur, when the interference detecting section detects the interference; and a second imaging-position correcting section configured to correct the imaging position based on the non-interference position, wherein the program generating section generates the operation program based on positional data of the robot model when the robot model positions the imaging section model or the workpiece model at the imaging position corrected by the second imaging-position correcting section.

9. The programming device according to claim 1, further comprising an imaging-timing setting section configured to set a start time point and an end time point of an imaging operation of the imaging section to image the portion of the workpiece to be imaged, wherein the program generating section generates the operation program for causing the imaging section to carry out the imaging operation over a time period from the start time point to the end time point set by the imaging-timing setting section.

10. The programming device according to claim 1, further comprising an order determination section configured to determine an order for moving the imaging section model or the workpiece model by the robot model to a plurality of imaging positions where the imaging section respectively images a plurality of target portions extracted by the target-portion extracting section, wherein the simulating section moves the imaging section model or the workpiece model to the respective imaging positions in accordance with the order determined by the order determination section.

11. A method of generating an operation program for moving an imaging section or a workpiece by a robot and imaging the workpiece by the imaging section, the method comprising:

arranging, in a virtual space, a workpiece model modeling the workpiece, a robot model modeling the robot, and an imaging section model modeling the imaging section;

extracting a target portion of the workpiece model, which corresponds to a portion of the workpiece to be imaged, in accordance with a predetermined extraction condition;

moving the imaging section model or the workpiece model by the robot model to an imaging position where the imaging section model is to image the extracted target portion; and generating an operation program for causing the imaging section to image the portion of the workpiece to be imaged, based on positional data of the robot model when the robot model positions the imaging section model or the workpiece model at the imaging position.

* * * * *